Dec. 15, 1970   J. J. MATIAS ET AL   3,547,738
APPARATUS FOR CREASING AND STIFFENING FABRIC AND FOR TEMPORARILY
BONDING FABRIC WORK-PIECES
Filed Dec. 27, 1966   13 Sheets-Sheet 4

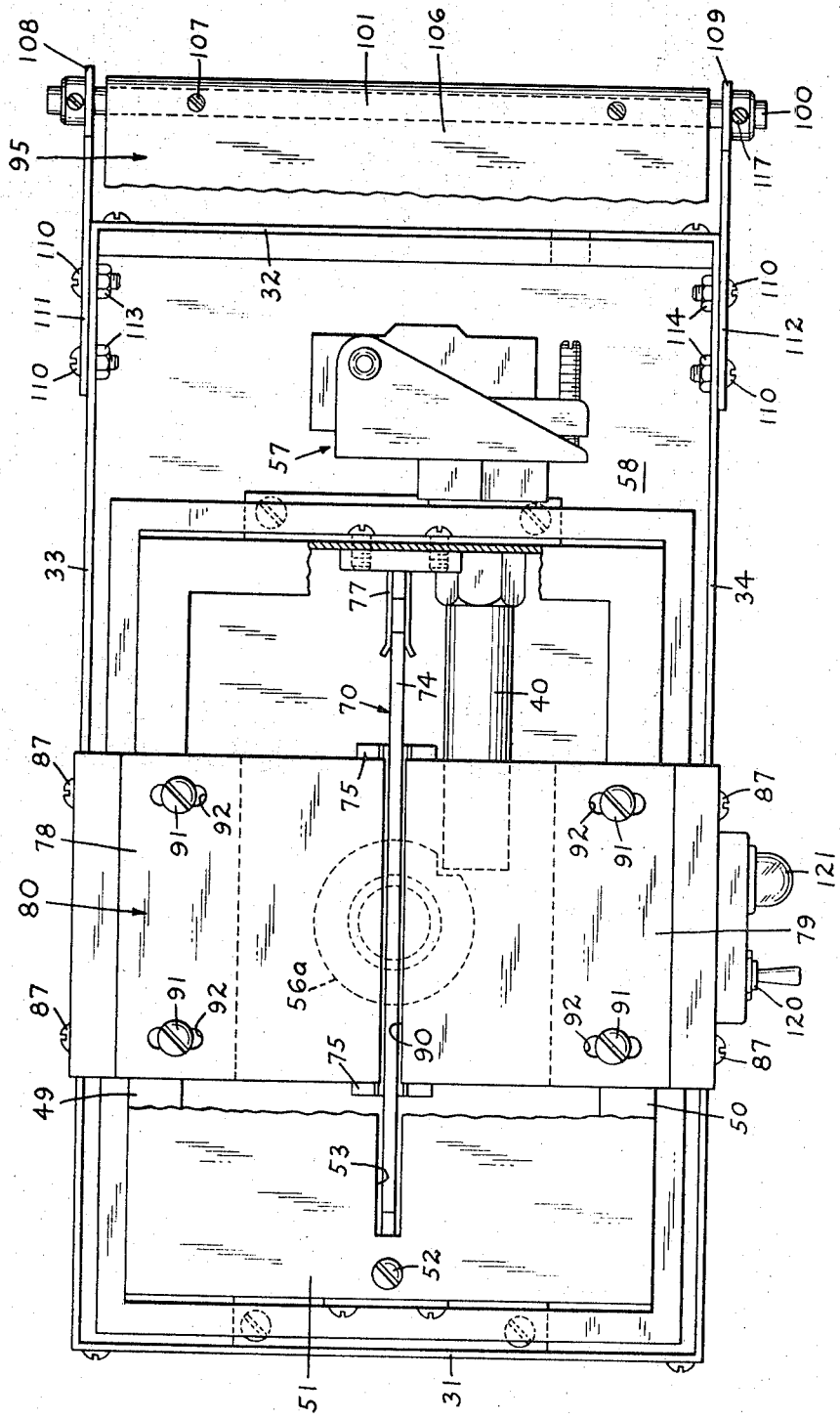

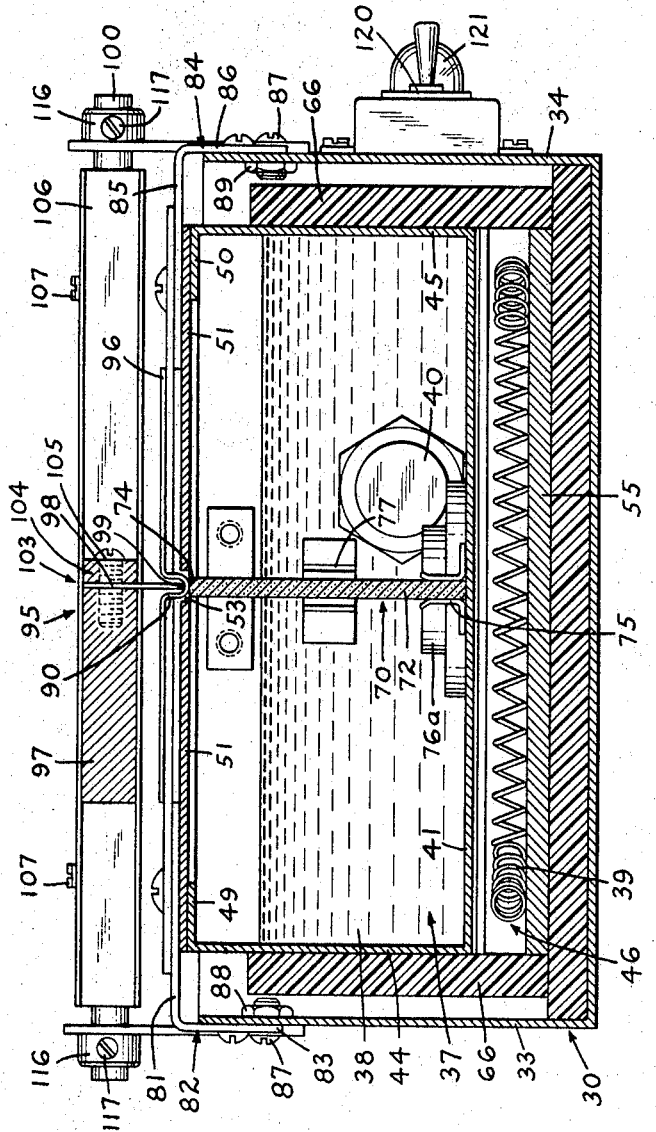
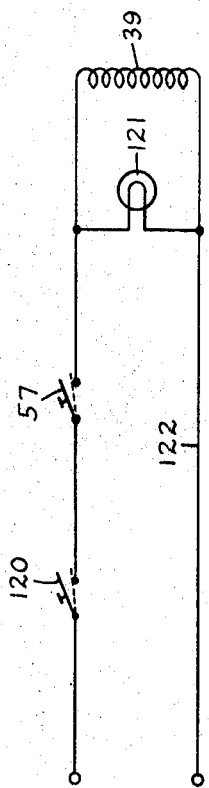
FIG.3.
FIG.4.

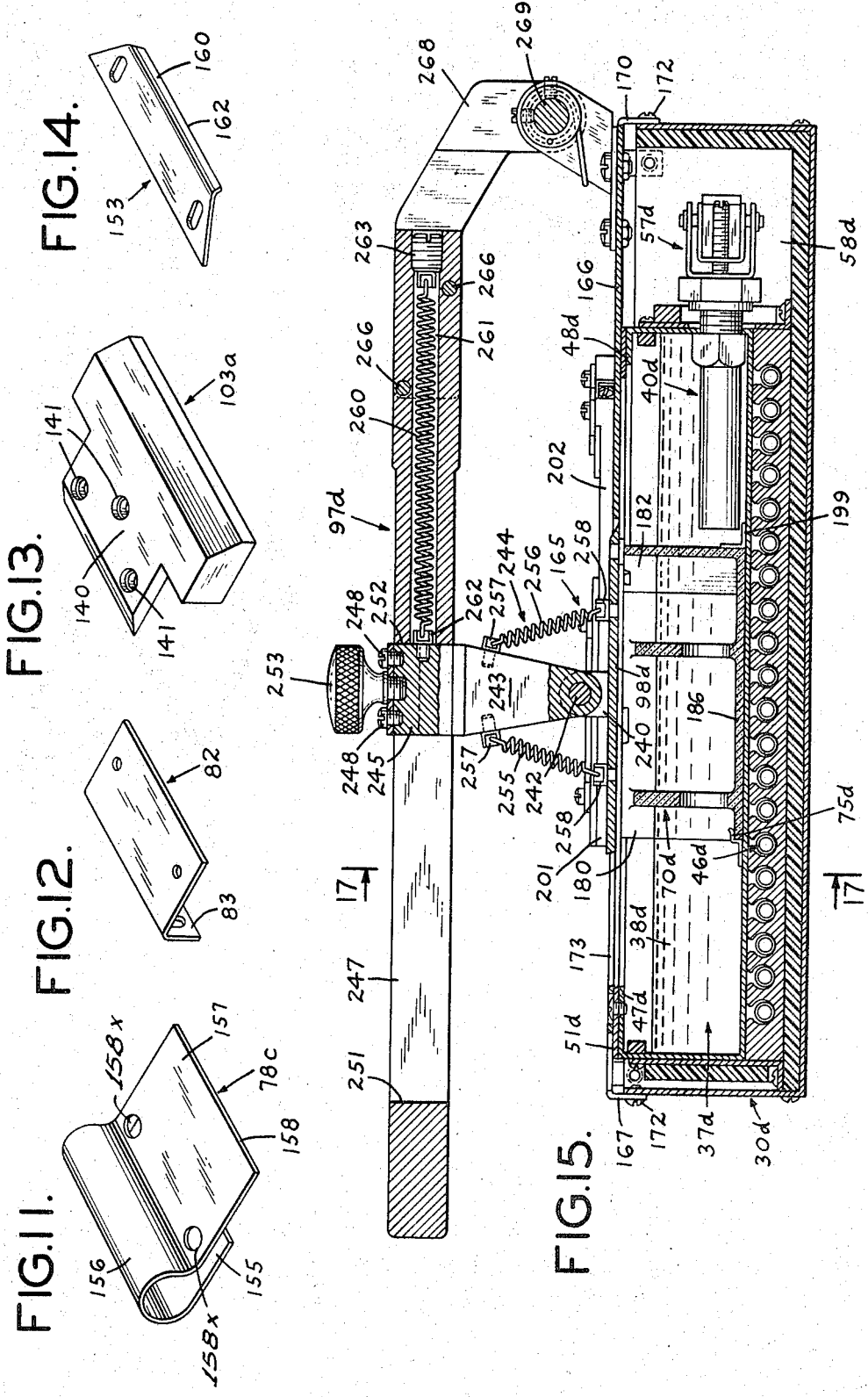

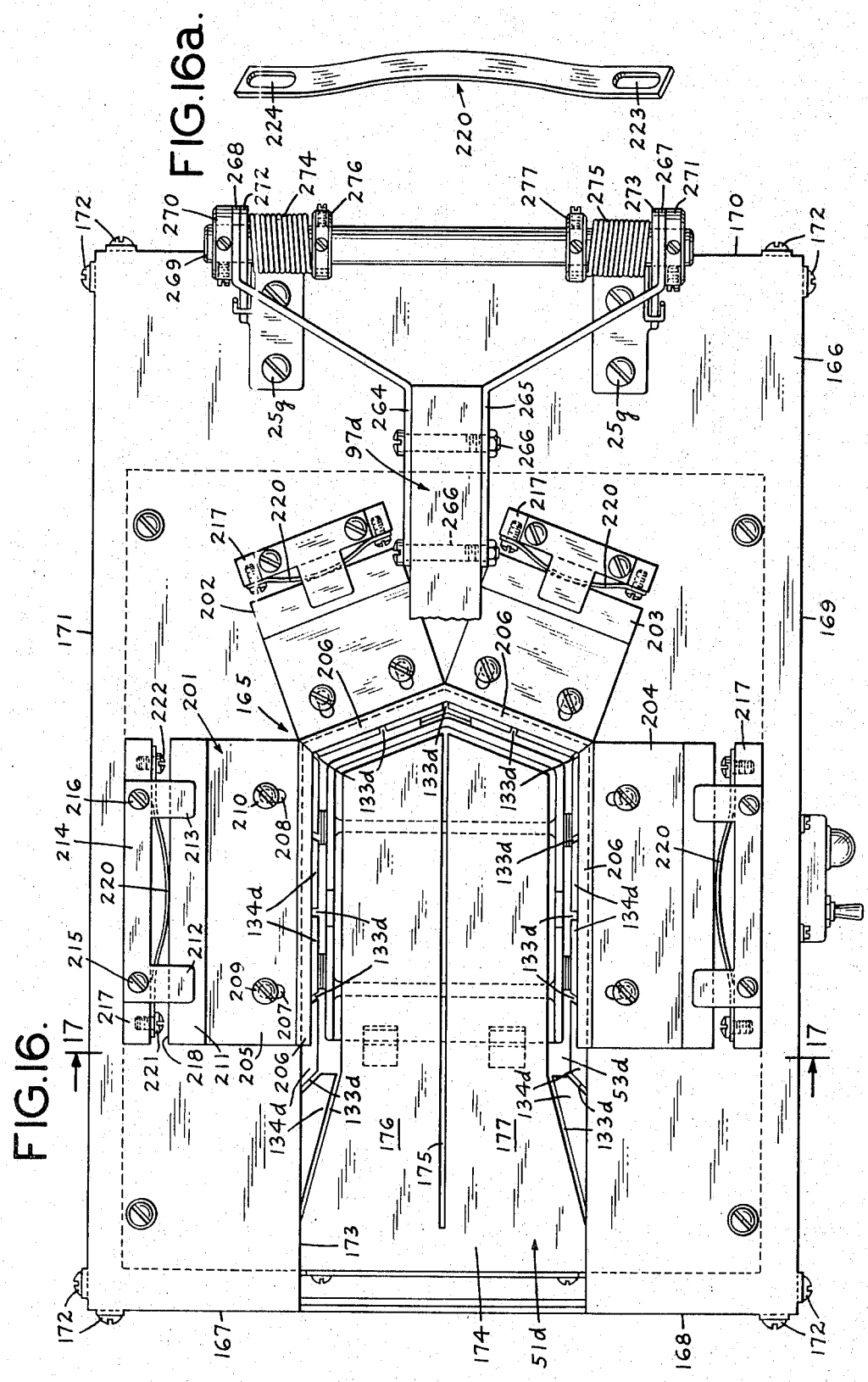

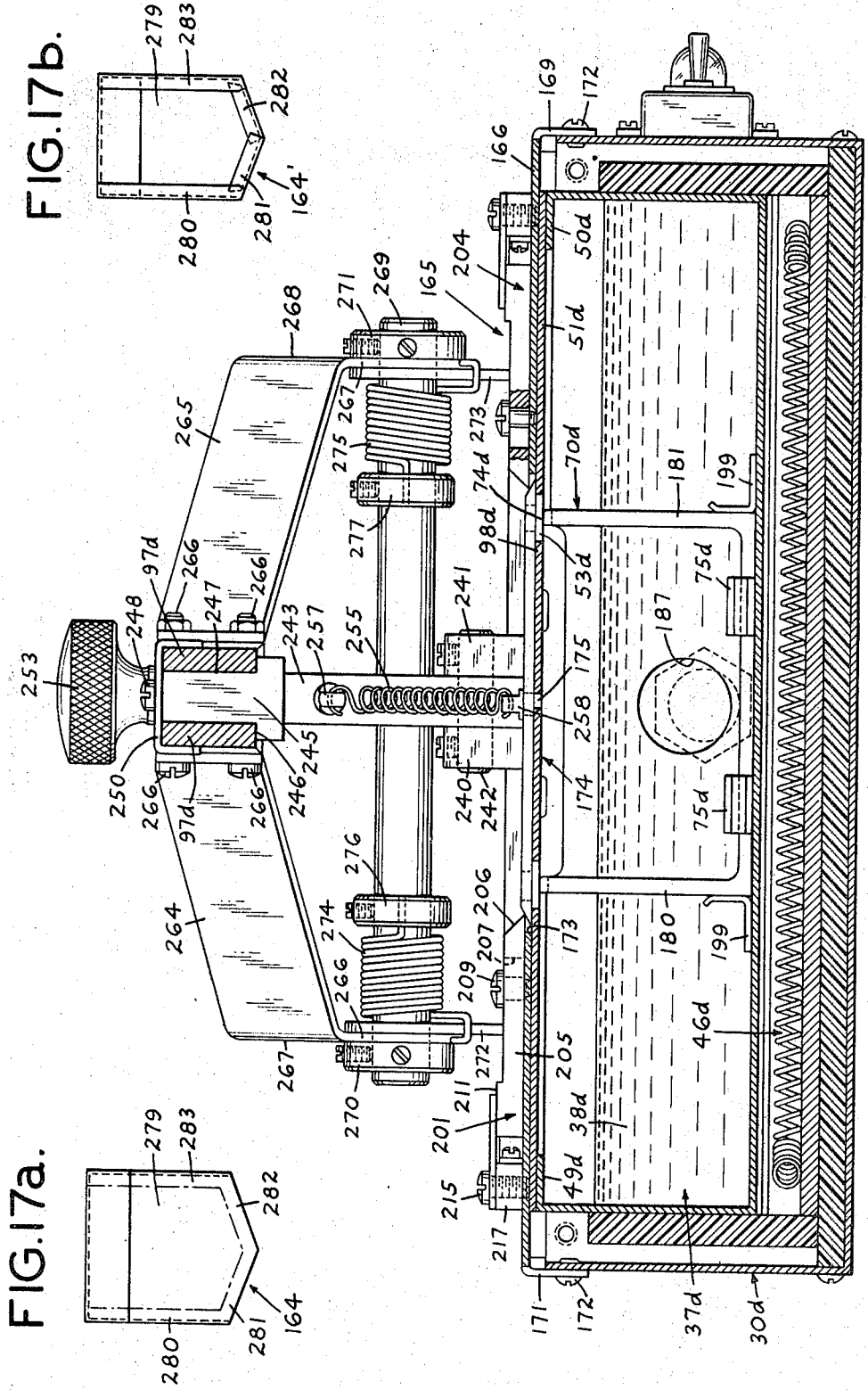

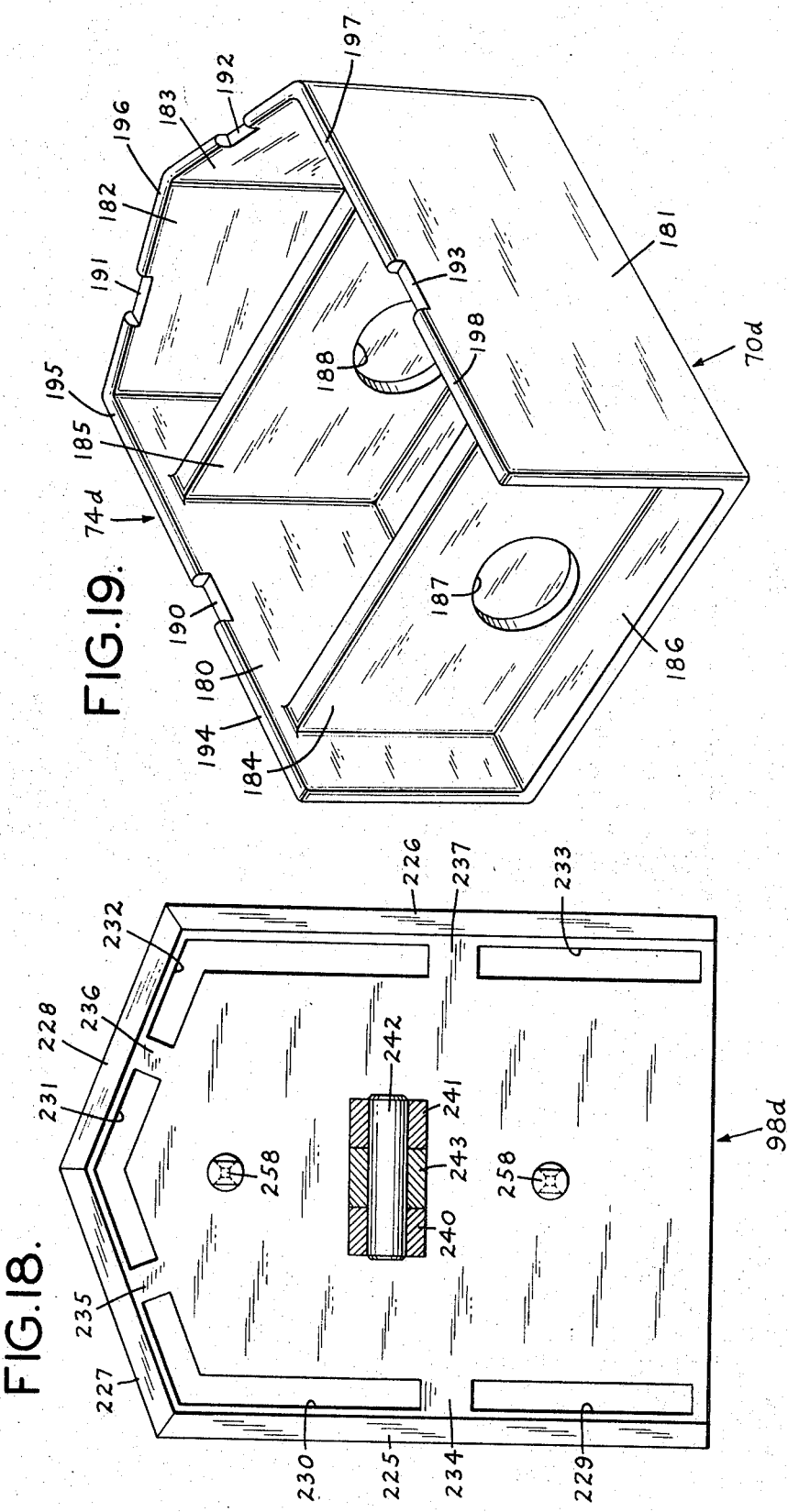

United States Patent Office 3,547,738
Patented Dec. 15, 1970

3,547,738
APPARATUS FOR CREASING AND STIFFENING FABRIC AND FOR TEMPORARILY BONDING FABRIC WORK-PIECES
James J. Matias, Hoffman Estates, and John G. Attwood, Oak Park, Ill., assignors to Union Special Machine Company, Chicago, Ill., a corporation of Illinois
Filed Dec. 27, 1966, Ser. No. 604,704
Int. Cl. B05c *11/105;* B65c *9/22*
U.S. Cl. 156—492      22 Claims

ABSTRACT OF THE DISCLOSURE

Apparatus and method for stiffening fabric by applying a changeable phase stiffening agent (such as, paradichlorobenzene) to the fabric by moving the stiffening agent in liquid phase from a supply through a rigid porous applicator wicking element by capillary action to wet an exposed surface of the wicking element and contacting the fabric with the wetted surface to cause the liquid to impregnate the fabric, after which the stiffening agent is changed to solid phase in the fabric.

---

Figure 1:
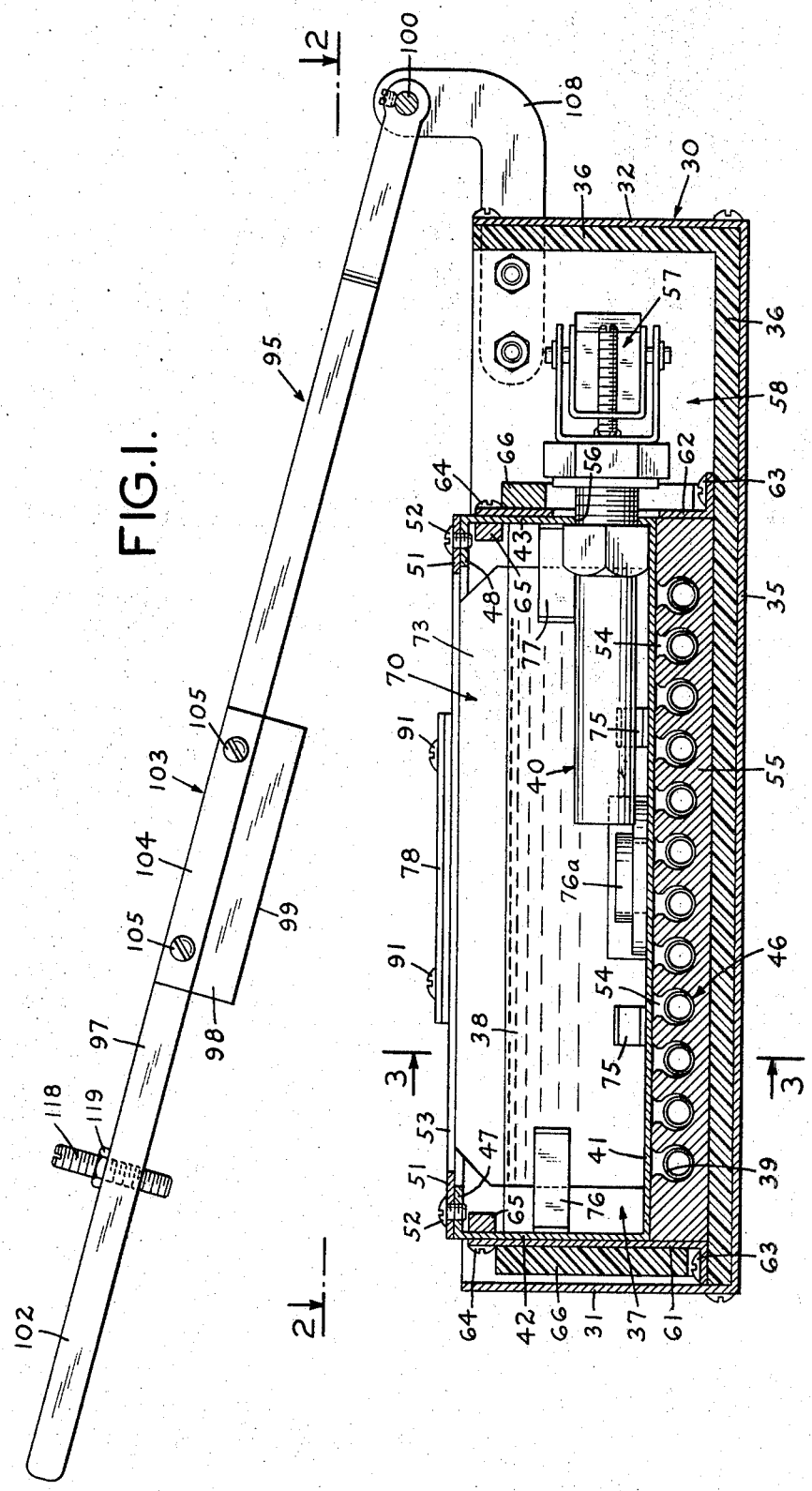

This invention relates generally to the creasing of fabrics and temporary bonding together of pieces of fabrics for performing operations, such as a sewing operation or the like, on the creased or bonded pieces.

More particularly, the invention relates to method and means for treating or handling fabrics and the like for sewing on a sewing machine or for performing other work on the fabrics and also to method and means for temporarily joining together of individual pieces of fabric prior to the performance of stitching or sewing the pieces and also it relates to the folding and creasing of fabric pieces to prepare them for such stitching or sewing.

In United States patent application of Attwood and Matias, Ser. No. 464,956, filed June 18, 1965, now U.S. Pat. No. 3,329,116, there is disclosed a method and apparatus in which a stiffening agent is employed wherein the stiffening agent comprises one that is caused to be impregnated in the fabric in its liquid phase and the stiffening agent is caused to change its phase to solid, thereby stiffening the fabric and the so stiffened fabric is then sewn, stitched or otherwise worked upon, after which the stiffening agent is caused to change its phase to gaseous or vapor form and is thereby removed from the fabric.

As examples of changeable phase stiffening agents having the characteristics suitable for the practice of such method, para-dichlorobenzene, naphthalene and tetrabutyl alcohol, may be mentioned. Other organic compounds having similar characteristics which make them suitable as stiffening agents for like purposes are not to be excluded from the contemplation of this invention.

It is an object of this invention to provide a commercially useful method and means for quickly and efficiently temporarily preassembling several individual fabric sections or for temporarily prefolding and creasing individual or several superimposed fabric sections into desired shape by the use of a changeable phase stiffening agent for performing other operations thereon such, for example, as sewing or stitching, after which the stiffening agent may be removed.

A further object of the invention is to provide a method and means for quickly and efficiently applying a changeable phase stiffening agent of the kind mentioned above to a fabric or to selected areas thereof by the use of a rigid applicator means functioning in the manner of a wicking means, said applicator being comprised of a rigid material which may be wetted by the liquid and which is provided with interconnected pores serving as capillaries whereby the stiffening agent in its liquid phase may be caused to move from a supply of the liquid to a selected area or areas of the wicking element by the phenomenon of capillary action, so that the fabric to be treated may be impregnated in a selected area or areas by contacting it with the wicking element; after which the stiffening agent in liquid phase is changed to solid phase to stiffen the fabric. As examples of such porous materials suitable for the wicking element, sintered metal, fiber metal, and porous or filter type ceramic may be mentioned.

It is a more specific object of the invention to provide method and means for maintaining a supply of stiffening agent in its liquid phase, such as, for example, molten or liquid para-dichlorobenzene, or the like, and to draw from said supply to a selected surface or surfaces of a rigid applicator, in the form of a wicking element, any amount of the liquid stiffening agent needed to impregnate fabric with the liquid in selected or predetermined area or areas of the fabric, and contacting the fabric with the wetted rigid wicking element, thereby to impregnate the fabric with said liquid, to cool the impregnated liquid to a sufficient degree after it has impregnated or wicked into the fabric so as to cause the stiffening agent to change to its solid phase, whereby to stiffen the fabric at the impregnated areas thereby to prepare the fabric for subsequent operations thereon, such as sewing or stitching or other similar or desired operations. And in those instances where two or more plies of fabric are superimposed one on another, to join them together or to crease folds therein to retain their shape, for such operations.

And it is a further object to provide means and method for controlling the degree of saturation of the stiffening agent into the fabric by regulating and controlling the time period during which the fabric is brought into engagement with the applicator.

Other objects will become apparent from the more detailed description which follows later on.

In its broader aspects, a work support is arranged in spaced relation above a rigid wicking element positioned in a bath of stiffening agent in liquid form, the wicking element having interconnected pores or interstices therein whereby the liquid will move through it to a selected surface, or surfaces, by capillary action. Such support may be provided with suitable apertures through which the workpiece can be brought into contact with the said selected surface or surfaces to impregnate the work-piece with the liquid; the wicking element projecting upwardly through said apertures upon lowering the support to below the level of the said selected surface, or surfaces; this lowering of the support being accomplished by mounting the work support on resilient supports, such as compression springs, or by using a work support which is, in itself, resilient and adapted to yield to pressure exerted upon it.

According to one form of machine embodying the invention, there is provided a container in which is contained a supply in liquid phase of a stiffening agent of the type above mentioned, namely, one which is usable without change in its chemical composition but is usable for the various steps of the method by changing its physical condition, i.e., changing its condition to liquid phase for applying it to the fabric in a selected area or areas by means of a rigid applicator having capillary characteristics, then changing it from liquid to solid phase in situ in the fabric to stiffen the fabric in the applied area or areas, preparatory to doing the desired work on the workpiece, such as sewing or stitching, after which the solidified stiffening agent may be changed to vapor phase for removal of the stiffener from the fabric to return the fabric to its original flexible condition. Means are provided for heating the stiffening agent in the container to maintain it in liquid phase, and preferably a thermostat is included to These brackets being secured to the base of the shell by means of threaded screws 63. The supply container is vertically adjustable in the brackets 61, 62 by means of screws 64 extending through vertically disposed slots in the upstanding legs of the brackets and thence through the front and rear wall of the supply container and threaded into threaded bores of nut blocks 65 which clamp the supply container 37 in desired adjusted position. The supply container 37 is provided with insulation 66 extending around its upstanding walls 42, 43, 44, 45.

A stiffening agent applicator 70, herein called a wicking element which, as shown, is in the form of a rigid plate having pores therein to produce capillary action, is mounted in the supply container. As shown, this element is made of porous, sintered metal, which is brass. As to other suitable material for the wicking element, porous ceramic and other porous or sintered metal may be mentioned. Sintered brass is preferred because it is a good heat conductor, it is durable, is of relatively low cost and is corrosive resistant.

The wicking plate 70 is mounted in the supply container 37 so that its lower portion 72 is submerged in the liquid stiffening agent 38, which, as shown, is para-dcb and with its upper portion 73 registering with slot 53, so that the exposed upper area 74 (herein called the contact area) of the wicking plate, is in alignment with slot 53 and extends up to the under surface of the cover plate 51 but not above the top surface of the cover plate. The wicking plate 70 is maintained in desired position by means of retaining clips 75 mounted on the bottom wall 41 of the supply container and similar holding clips 76, 77 mounted on front and rear walls 42 and 43.

Mounted adjacent to and above the cover plate 51 is a work-supporting plate 80 of metal, which forms a work-supporting platform on which to place fabric pieces to be stiffened. As shown, the work-supporting platform 80 comprises two oppositely disposed flat pieces 78 and 79. Left-hand piece 78 is mounted on a horidontally disposed arm 81 of a bracket 82, the vertically disposed leg 83 of which is secured to the upstanding left side wall 33 of the shell. A similar bracket 84 having a horizontally disposed arm 85 and a depending leg 86 is similarly secured to right side wall 34 of the shell. The brackets 82, 84 are vertically adjustable, there being vertical slots in the legs 83, 86 and threaded screws 87 extending through the slots and thence through bores in the walls of the shell and the screws are threaded into clamping nuts 88, 89 for clamping the brackets in vertically adjusted position.

The work-support pieces 78, 79, together forming the work-support plate or platform 80, are adjustable toward and away from slot 53. Thus, a slot 90 is provided in the work-support 80 of about the same width of slot 53 in the cover plate 51. Clamping screws 91 extend through the slots 92 into threaded bores in flanges 49, 50, and the work-supporting pieces 78, 79 may be clamped in adjusted position so that there is a slot 90 of desired width above and registering with the slot 52 in the cover plate 51.

A work-piece pressing device, designated generally by reference numeral 95, is provided for pressing a fabric work-piece 96 into contact with the exposed contact surface 74 of the wicking element 70. As indicated, the workpiece may be a single ply piece of textile which is to be folded or creased, or it may comprise two or more plies that are to be folded or creased and temporarily fastened together by the stiffening agent. As shown, in FIGS. 1–3, the work-piece pressing device comprises a presser arm 97 and a presser element 98. The presser arm is pivotally mounted to swing around the pivotal axis of a rock shaft 100 mounted to rotate in brackets secured to the shell which serves as a frame. Mounted on presser arm 97 is presser element 98. As shown, this is a plate having a folding or pressing edge surface 99 to depress the fabric work-piece and cause it to contact the exposed contacting or work surface 74 of the wicking element 70 in an elongated narrow pattern, corresponding generally to the slot 90 of the work-support platform 80 through which the pressing edge 99 of the presser element may pass. The swing arm 97 is mounted at its rear end 101 on the rock shaft 100 and its opposite forward end portion 102 provides a working handle for manually rocking the swing arm on its pivot, to operate the working edge 99 of the presser plate into contact with the fabric work-piece 96 to press it and to raise it out of contact for removal of the pressed or creased work-piece. The presser plate 98 is preferably made of a rigid material having a low friction coefficient. A polyethelene terephthalate resin is admirably suited for the purpose. The product sold by E. I. du Pont de Nemours & Co. under the trademark Mylar has been found to work successfully. The plate 98 is removably secured to the swing arm 97 by providing a clamp plate adaptor 103 comprising a plate 104 removably secured to the swing arm. The upper portion of plate 98 is clamped between the side of the swing arm and the clamping plate 104 by means of screws 105 extending through the clamp plate and presser plate and screwed into suitable threaded bores in the swing arm.

The swing arm is broadened at its rear or pivoted end. The broadened portion 106 is provided with a bore through which the rock shaft 100 extends and is clamped to the rock shaft by means of set screws 107. The rock shaft 100 is mounted for rotation in bearings at the outer ends of upstanding supporting arms of brackets 108, 109 adjustably secured to the side walls 33, 34 of the shell by means of clamping screws 110 extending through the bracket legs 111, 112 and threaded into threaded nuts 113, 114. Retaining collars 116 secured to the end portions of rock shaft by set screws 117 constrain the rock shaft from endwise movement. An adjustable screw 118 threaded through the swing arm and locked by lock nut 119 serves as an adjustable stop member; to limit the downward movement of the swing arm, the lower end of the stop screw 118 engagin the top plate to stop downward movement of plate 98 at the desired place.

Figures 3, 4:
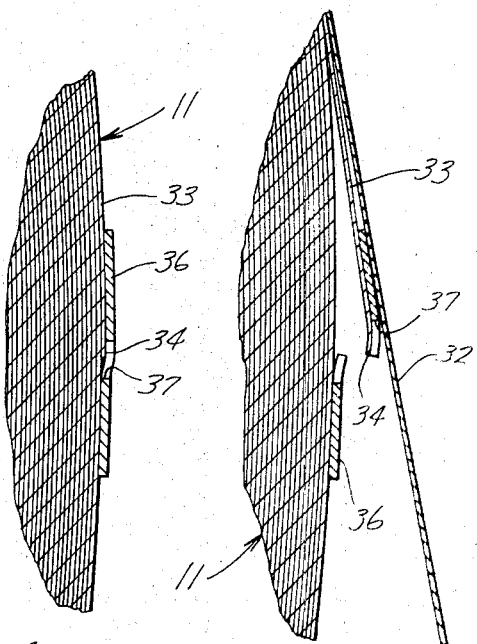

The wiring diagram, FIG. 4, shows an electrical hook-up for this apparatus. The terminals of heating coil 39 are connected in a circuit 122 with 115 volt A.C., 60 cycle source of electrical power, a manually operable main switch 120 and an adjustable thermostat switch 57 are arranged in series with the heating coil 39. There is also provided a pilot or indicator lamp 121 which is connected in parallel with said coil 39. Hence, by adjusting the thermostatic control parts 57, the para-dcb in the supply tank may be maintained at any desired temperature when main switch 120 is "on."

Figure 2:
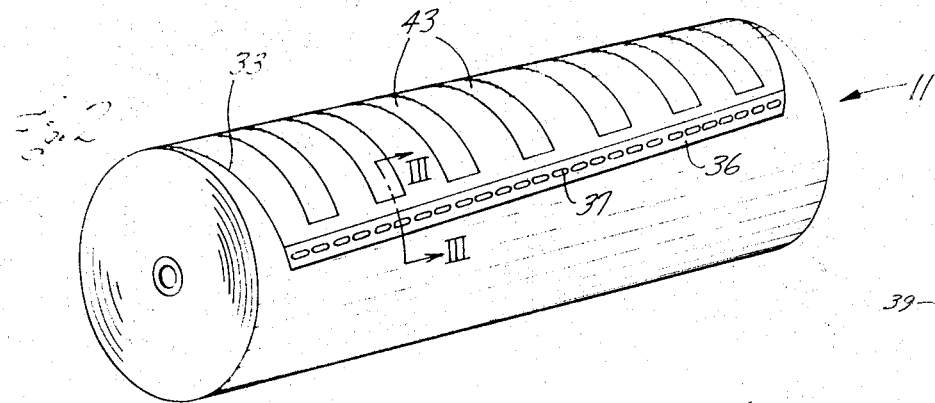
Figure 7:
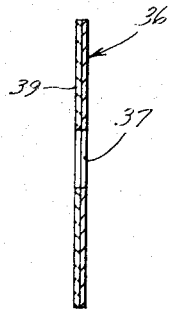
Figure 5:
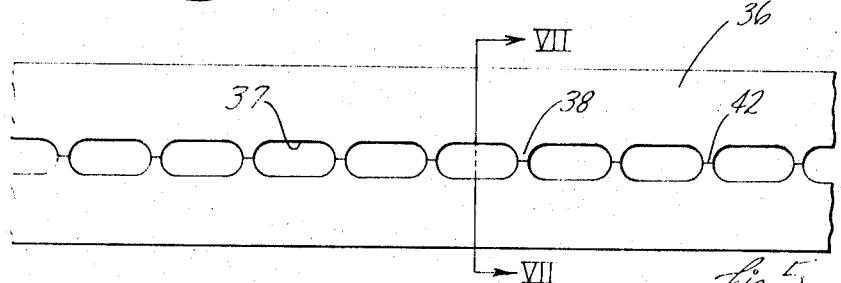
Figure 6:
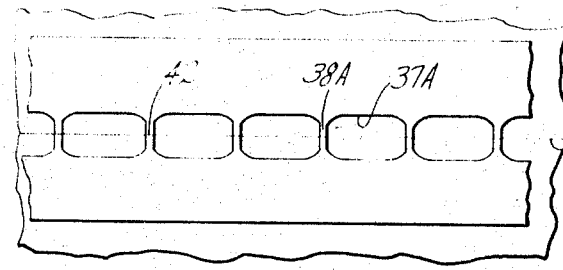

In the operation of the apparatus, illustrated in FIGS. 1–4, the para-dcb 38 in the supply tank is maintained at a temperature a few degrees above its melting point so that it is in liquid phase. The melting point of para-dcb is 127° F. or close thereto, so the liquid in the supply container is maintained, say approximately 3° to 5° above the melting point, or at such temperature as will produce good wicking of the fluid by capillary action through the wicking element 70 to the exposed surface 74. A piece of fabric 96, for instance a textile, is placed on the work-support plate with the part that is to be impregnated with liquid para-dcb over the slot 90; the swing arm having been swung to its upper position as shown in FIG. 2 before positioning the work-piece on the work-supporting plate or platform. The swing arm is lowered and the presser plate 98 presses the fabric through slot 90 into engagement with the wetted exposed surface 74 of the wicking element and a fold or crease is produced in the fabric. As the liquid stiffening agent wicks through the fabric, the metal work-support members cool it, and this forms a barrier of cooled or solidified para-dcb, preventing unwanted spread of the stiffening agent. The stiffening agent is chilled by the work-support plate and ambient temperature and becomes solidified. The fold or crease is thus stiffened, and is maintained in the fabric until such time as further work, such as sewing, is done on the work-piece or until the stiffening agent is warmed to above the melting point of the para-dcb or is removed therefrom by sublimation or evaporation.

Figure 6:
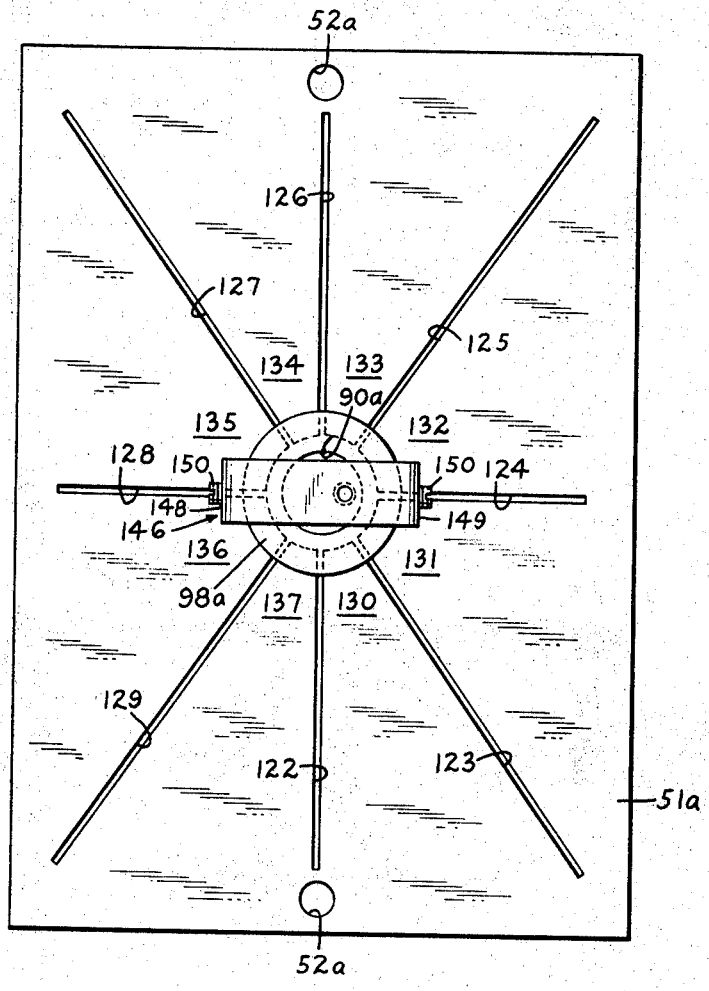
Figure 5:
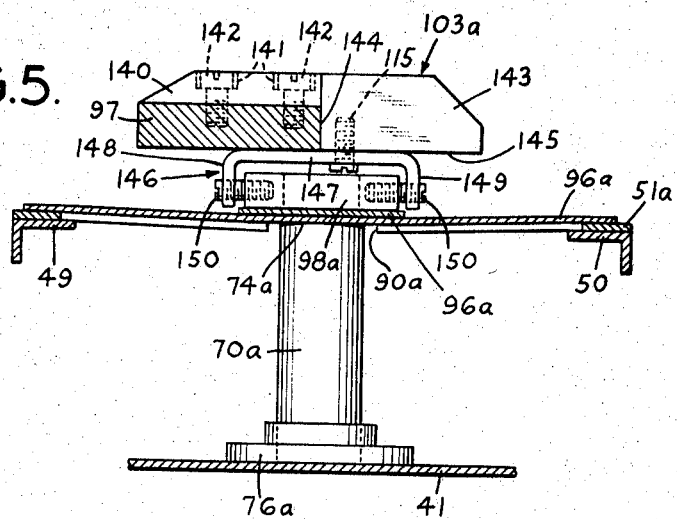

The apparatus described lends itself to modification so that the machine is readily adapted for application of the stiffening agent in other patterns, different from that illustrated in FIGS. 1–3. For example, the machine may be adapted for attaching a work-piece, such as applique, to the back of a glove, to prepare the combined pieces for sewing the applique to the glove. Such a machine is illustrated in FIGS. 5 and 6. It comprises a cover plate, presser element and wicking element that may be used in place of those described above. There is provided in the supply container 37 a supporting socket block 76a for mounting therein a cylindrically shaped wicking element 70a in place of the plate-like wicking element 70. The lower end of the wicking element 70a rests in a central bore of the block 76a which is secured to the bottom wall of the supply container. The cover plate 51a comprises a plate of size and dimension so that its peripheral edge portions rest upon the supporting shelf provided by the inturned flanges 47, 48, 49, 50 of the front, rear and side walls of the supply container 37. Screw holes 52a are provided to match with registering tapped holes in the front and rear flanges 47, 48 for securing the cover plate to the supply container. A central opening 90a of circular shape is provided in the cover plate 51a to register with the exposed top circular surface 74a of the cylindrical wicking element 70a; this central opening being slightly larger than the surface area 74a of the wicking element. The cover plate 51a is provided with a plurality of cutouts 122 to 129, extending in a generally radial direction from the central opening 90a and terminating short of the periphery of the cover plate. The plate is made of springy or resilient metal, so the cutout slots provide a plurality of springy or resilient tongues 130 to 137, around the central opening 90a. When the plate 51a is in normal position on the supply container, the top surfaces of the inner edge portions of the tongue lie slightly above the exposed wicking surface 74a of the wicking element.

An adapter 103a is provided for securing a modified presser element 98a of circular shape and of similar material as 98 to the presser arm 97. The adapter piece 103a (see FIGS. 5 and 13) comprises a portion 140 having screw holes 141; this portion being secured, by means of screws 142, to the top surface of presser arm 97; and a portion 143 having a vertical side 144 engaging the side of the presser arm. The under surface 145 of the adapter piece lies flush with the under surface of the presser arm. A yoke shaped bracket 146 having a cross arm 175 and depending arms 148, 149 is removably mounted to the under surface 145 of the adapter piece by means of a screw 115 extending through the cross arm into a threaded bore in adapter portion 143. Mounted and journalled between depending arms 148, 149 of the yoke its a ring shaped presser element 98a; secured in place by screws 150 extending through the depending arms of the yoke and extending into the presser ring 98a. This is for exerting a downward pressure on a work-piece and cover plate.

The wicking element, cover plate, and presser element illustrated in FIGS. 5 and 6 may be used in the machine illustrated in FIG. 1–3 instead of the corresponding elements illustrated in those views. In such case, the fabric work-piece 96a is placed on the cover plate 51a with the swing presser arm 97 raised. The place on the fabric that is to be impregnated is positioned over the central opening 90a and the swing arm is swung downwardly to bring the presser ring 98a into engagement with the fabric to apply pressure thereon. The tongues 130 to 137 being resilient permit the fabric outside the area 74a of the wet wicking element to move to a place lower than surface 74a and thus to bring the fabric into firm contact with the wetted surface 74a of the wicking element so that the liquid stiffening agent permeates the fabric. The ring 98a and the tongues 130 to 137 cool the spreading liquid and provide a barrier against unwanted spreading. The permeated liquid is cooled to solidify it and this stiffens the fabric at this preselected area. If desired, two or more plies of fabric may be temporarily secured together by placing the multiple plies over the central opening 90a. And the fabric may be maintained in the stiffened condition until the solidified stiffening agent is changed to liquid condition or is sublimed or evaporated off.

Figure 8:
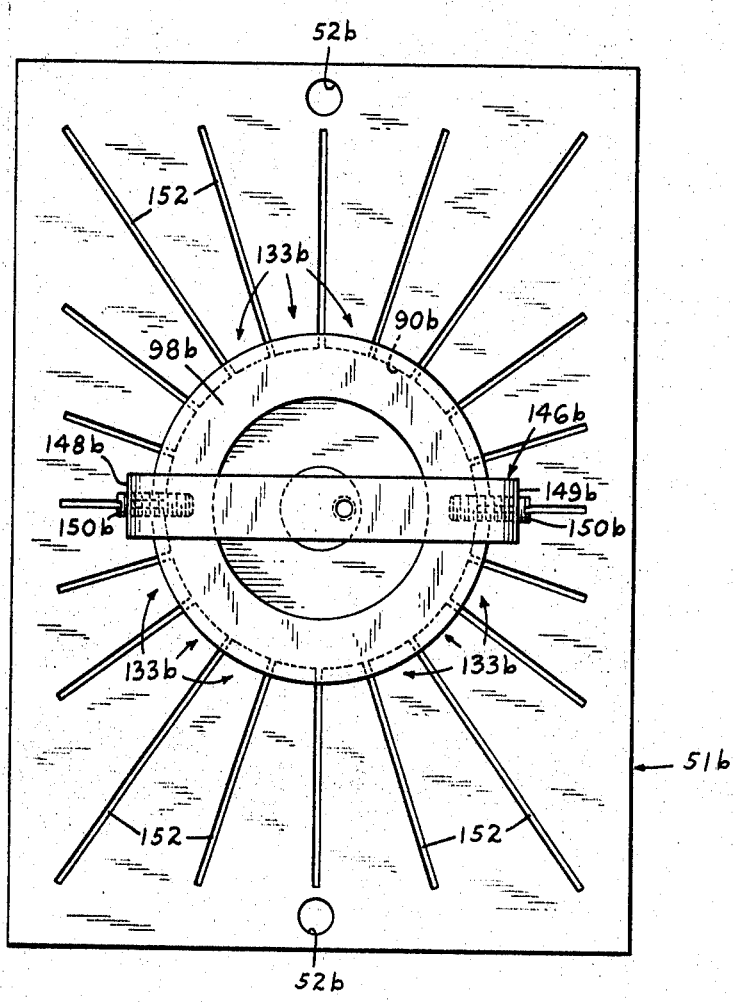
Figure 7:
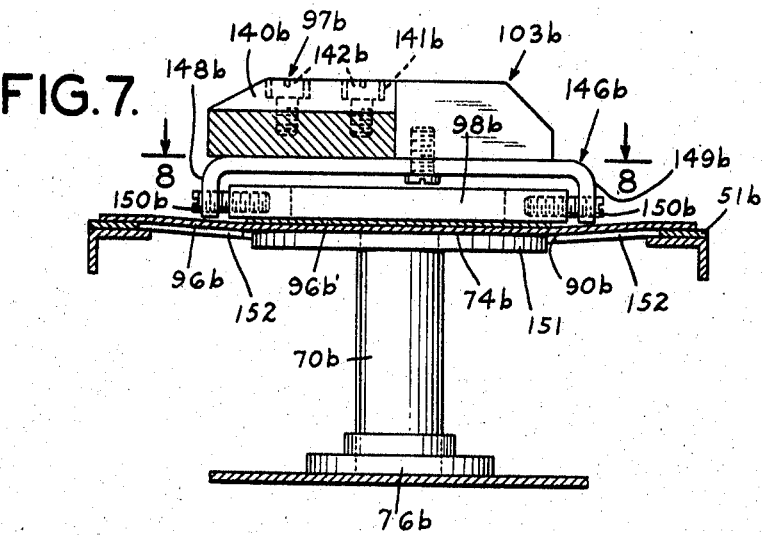

The modification illustrated in FIGS. 7 and 8 comprises cover plate 51b, presser element 98b, and wicking element 70b which are quite similar to corresponding parts 51a, 98a and 70a, illustrated in FIGS. 5 and 6. Likewise, the parts 51b, 98b and 70b may be used with the supply container 37 and its corresponding parts as illustrated in FIGS. 1–3. The wicking element 70b is provided at its top end with a circular table 151 of similar material so that the exposed upper circular wicking surface 74b of the wicking element is of greater diameter than wicking surface 74a of wicking element 70a (as shown in FIGS. 5 and 6). The top plate 51b has a central opening 90b slightly larger in diameter than the top wick surface 74b of wicking element 70b. A plurality of cutouts or slots 152 extending from the central opening 90b in a generally radial direction and terminating short of the periphery of the cover plate, provide a plurality of resilient tongues (designated generally by reference numeral 133b) around the central opening 90b. Screw holes 52b are provided to receive screws for fastening the cover plate to the upper open end of supply container 37 (shown in FIGS. 1–3). The yoke 146b (FIGS. 7–8) is wider than yoke 146 (FIGS. 5–6), thus to mount between its depending arms 148b; 149b a larger presser ring 98b, which is secured in place by screws 150b; the yoke being secured to adapter piece 103b in the same manner as described in connection with FIGS. 5–6. It will be noted that the outside diameter of presser ring 98b is slightly greater than the diameter of central opening 90b so that presser 98b overlaps the inner end portions of tongues 133b. In other respects, the machine generally speaking may be of the same construction as that of FIGS. 1–3. In operation of this modification, for example, two plies of fabric to be temporarily joined together are placed on work-supporting plate 51b in superimposed position, the place to be impregnated with stiffening agent being positioned over central opening 90b. Upon moving presser arm 97b in downward direction, the fabric work-pieces 96b, 96b', are impregnated with liquid stiffening agent where the fabric contacts the wetted wicking surface 74b. The presser ring 98b and the inner end portions of tongues 133b cooling the liquid para-dcb to solidify it to form a barrier to prevent unwanted spreading; the impregnated areas being cooled to solidify the stiffening agent, to maintain the work-pieces stiff for performing further work thereon as previously described.

Figure 10:
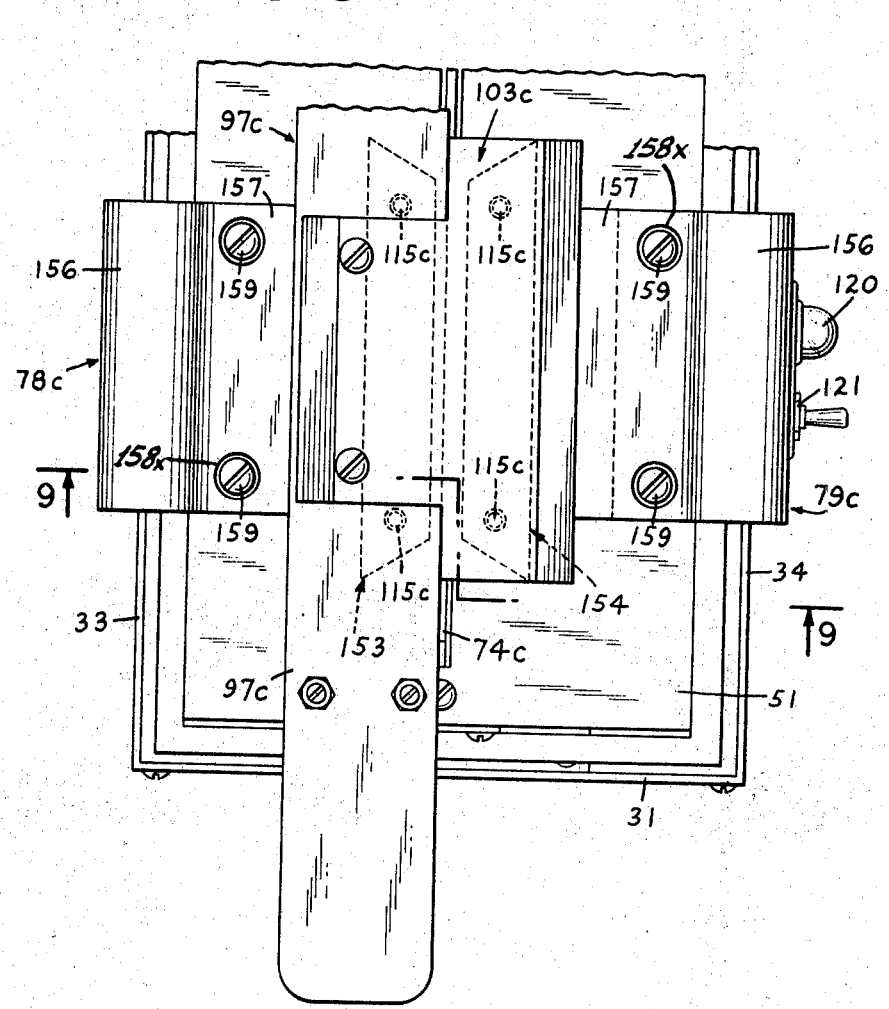
Figure 9:
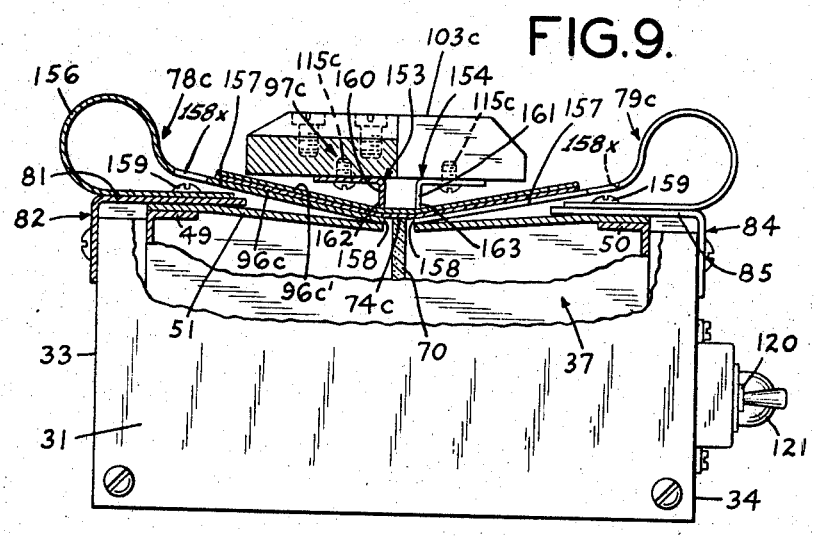

The modification illustrated in FIGS. 9, 10 is designed to impregnate fabric work-pieces in a narrow elongated pattern, and is in general similar to the apparatus illustrated in FIGS. 1–3 but differing therefrom in that the work locating and work-piece supporting means and the presser element have been modified. In the construction, illustrated in FIGS. 9–10, the left-hand carrier bracket 82 and right-hand carrier bracket 84 (corresponding to brackets 82, 84 in FIG. 3) support on their horizontally disposed arms 81 and 85 a pair of work-supporting plates 78c, 79c designed for spring action on each side of slot 53 in the cover plate 51. A typical spring action plate 78c is shown in perspective in FIG. 11. It comprises a plate of springy metal, having a base portion 155 and a curved portion 156 provided by bending the plate metal on itself to form the loop 156, the plate terminating in a flat portion 157. The flat plate portion 157 has an edge 158 running parallel with the axis of the curved portion. Suitable screw receiving holes are provided in the base portion 155 and registering holes 158x in the flat portion for access to screws 159 which secure the base portion of the spring supporting plates 78c and 79c to the arms 81 and 85 of the carrier brackets 82, 84. The two flat portions 157 of spring plates 78c and 79c thus form a work-supporting platform.

The presser element, see FIG. 9, comprises two oppositely disposed elongated angle pieces 153, 154, the horizontal webs of which are secured to the underside of the swing arm 97c and adaptor 103c by fastening screws 115c. The elongated flat vertically depending webs 160, 161 lie in parallel spaced relation and their presser edges 162, 163 lie over the inner edge portions of the flat work-supporting portions 157 of the spring action pieces 78c, 79c. In this modification, the inner edges 158 of the spring action work-supporting plates, in normal position, lie slightly above the cover plate 51 and form a slot above the upper exposed surface 74c of the wicking element 70. When the swing arm 97c is raised, the fabric work is placed on the work-supporting platform formed by surfaces 157. In this instance, the workpiece comprises two plies 96c and 96c' of fabric, one superimposed on the other. The place in the fabric to be impregnated is positioned over the slot provided by the edges 158 of the spring plates 78c, 79c. The swing arm 97c is lowered and the two presser edges 162, 163 of the presser elements press down on the fabric, above the edge portions of the spring plate, the resiliency of the work-support plates permitting the fabric to be pressed downwardly into contact with wetted upper exposed contact surface 74c of the rigid porous wicking element 70. The contacting edges 162, 163 clamping the fabric and preventing unwanted spread of the liquid stiffening agent which impregnates the fabric and meantime the liquid stiffener agent is cooled and solidified in an elongated narrow pattern. The two plies of fabric will be maintained in bonded and in stiffened condition for performing further work on the work-piece as previously described.

The machine illustrated in FIGS. 15–19 is adapted for preforming and pressing pocket blanks such as blanks for shirt pockets. A typical blank prior to folding and pressing 164 and after folding and pressing 164' being illustrated in outline in small scale respectively in FIGS. 17a and 17b. This machine comprises an insulated supply container 37d, and electrical heating device 46d, a thermostatic heat control device 40d mounted within a shell frame 30d similar to corresponding parts 37, 46, 40 and 30 as illustrated in FIGS. 1–3. In fact, the various modifications are so designed that they have similar parts so that one machine having the basic elements is adapted to receive the modified parts, so that a single machine or kit having the additional parts may be set up and adapted for various uses and purposes. And it may be noted here that similar reference numerals are used for similar or corresponding parts in the various figures of the drawings, with a particular sub-letter in particular views; sub-letter d being used in FIGS. 15–17.

A pocket blank folding device (designated generally by reference character 165) is mounted on a top or table plate 166 positioned on top of frame shell 30d. The table plate 166 has downwardly turned flanges 167, 168, 169, 170, 171, which engage the upper portions of the side walls of the frame shell and is secured thereto in adjusted position by means of screws 172. The table plate 166 has a generally U-shaped cutout 173, which is of the same general outline as the pocket blank 164 (see FIG. 17a); further details being described later on.

Mounted on the inturned flanges 47d, 48d, 49d, 50d of the vertical walls of supply container 37d by means of screws and beneath the table plate 166, is a cover plate 51d. The cover plate 51d has a generally U-shaped cutout 53d conforming generally to the shape of the pocket blank. A plurality of cutout slots 133d extend from the U-shaped cutout 53d in a generally radially direction. These cutout slots terminate short of the periphery of the cover plate; thus providing a plurality of resilient tongues 134d around the U-shaped cutout 53d. It will be observed that cutouts form a tongue-like portion 174, which itself is provided with a cutout slot 175 which splits the tongue into two half sections 176, 177. Hence, the cover plate 51d is resilient around the cutout 53d as the surrounding tongues may be depressed from normal position by applied downward pressure and will return to normal position upon release of the downward pressure. Likewise, the larger tongue 174 is resilient.

The wicking element 70d for this machine is shown in perspective in FIG. 19. It is rigid and may be made of porous material such as mentioned above. As shown, it is of sintered brass and comprises upstanding side walls 180, 181 and end walls 182, 183 tied together and reinforced by cross-braces 184, 185 and a bottom wall 186; the cross pieces 184, 185 having openings 187, 188 for the passage of liquid stiffening agent, when the wicking element is submerged in the liquid stiffening agent 38d in the supply container 37d. The exposed horizontal edge surface 74d of the wicking element 70d is interrupted by notches 190, 191, 192, 193, thus providing contact surfaces 194, 195, 196, 197, 198 which, as explained later on, supply liquid stiffening agent to impregnate the pocket blank when the blank is brought into engagement with the wicking element.

The wicking element 70d is positioned in supply container 37d with its bottom wall 186 resting upon the bottom wall of the supply container and with the upper edge contact surfaces in registry with the U-shaped cutout 53d of cover plate 51d. It will be observed that the width of the U-shaped cutout is wider than the width of the contact surface 74d of the wicking element. The wicking element is removably mounted in supply container 37d and is maintained in desired position by means of clips 75d and bracket 199.

The folding device comprises a presser plate 98d mounted on swing arm 97d and a plurality of folder slide plates 201, 202, 203, 204 mounted to slide on the table plate 166 in a direction toward and away from the U-shaped cutout 53d; these folder plates being spring biased toward the U-shaped cutout. All of the presser plates are mounted in similar fashion so it will suffice to describe one, as typical. Referring to slide plate 201 (see FIGS. 16, 17) it comprises a flat plate 205 of generally rectangular shape having a straight leading bevelled edge 206, a pair of spaced elongated holes 207, 208 through which extend shouldered screw pins 209, 210 threaded into bores in table plate 166; these pins serving as guide pins and the elongated holes 207, 208 through which extend shouldered screw pins 209, 210 threaded into bores in table plate 166; these pins serving as guide pins and the elongated holes 207, 208 permitting limited forward and rearward sliding movement of the folder plate 205. The plate 205 has a raised shoulder portion 211 along its rear edge portion which serves as a bearing surface for hold-down fingers 212, 213. These hold-down fingers extend outwardly from a connecting arm 214 which is secured by means of screws 215, 216 to the top surface of a buttress block 217; the screws 215, 216 extending through the connecting arm and block into tapped holes in the table plate 166. Mounted between the rear edge 218 of folder plate 205 and the block 217 is a leaf spring 220 secured to the block by means of screws 221, 222 extending through elongated holes 223, 224 in the leaf spring. The leaf spring yieldingly urges the folder plate 205 horizontally in a direction toward U-shaped cutout 53d. In its innermost and normal position, the bevelled edge 206 of the folder plate 205 lies a little beyond the edge of cutout 173 of the table plate 166 and over the resilient tongues of the cover plate, but not so far as U-shaped cutout 53d. All of the folder slide plates 201, 202, 203, 204 are mounted in the same fashion; it being noted, however, that the leading bevelled edges of plates 201 and 204 are of a length corresponding to the sides of the pocket blank and the bevelled edges of plates 202, 203 are of a length corresponding to the sides of the V-shaped bottom end of the blank. Also, the direction of movement of the folder plates is perpendicular to the edges of the pocket blank.

The presser plate 98d (shown in top plan view in FIG. 18 and partly in section, the swing arm having been removed for clarity) comprises a plate of the same general shape as the top edge surfaces of the wicking element 70d, having bevelled side edges 225, 226 and bevelled bottom end edges 227, 228. It has cutouts 229, 230, 231, 232, 233 in its edge portions lying inside the bevelled edges. These cutouts register with the contact surfaces 194 to 198 of the wicking element 70d when the presser plate is moved downwardly on swing arm 97d, as will be explained later on. The uncut portions 234 to 237 of the presser plate register with notches 190 to 193 and permit the plate to move to a position below the contact surfaces of the wicking element upon application of downward pressure on the presser plate. Mounted in the center portion of the presser plate are a pair of upstanding spaced bosses or clevis arms 240, 241 in which is fixedly mounted a pivot shaft 242. Rotatably mounted on the pivot shaft 242 at its lower end and between the clevis arms is an upstanding shank portion 243 of presser plate holder 244. This holder is secured at its upper end to the swing arm 97d as later described.

The upper end of shank 243 is in the form of a shouldered key, having a key part 245 and a flange providing a shoulder 246, which engages the bottom side of the spring arm 97d. The key part 245 is slidably mounted in a slot or keyway 247, extending longitudinally of the swing arm 97d. An inverted U-shaped plate, the cross arm 250 of which extends over the key part 245 and the swing arm, and which is secured to the key part by screws 248, maintains the upper end of shank 243 in slidable engagement with the swing arm in a manner to permit the shank to slide longitudinally along the swing arm within the limits of the keyway 247. The keyway extends from a point 251 at the forward end portion of the swing arm to a stop point 252 at which latter or normal position the presser plate will be over and in registry with the wicking element 70d (see FIG. 15). In its forward position the presser plate lies beyond the wicking element. A knurled knob 253 having a threaded shank end is secured in a tapped hole in the upper end of shank 243 and provides a convenient means for manually sliding the presser holder shank with its attached presser plate 98d forwardly and rearwardly along the keyway 247. A pair of oppositely disposed helical tension springs 255, 256 yieldingly stabilize the presser plate 98d. The upper ends of these springs are secured to oppositely disposed stakes 257 in the front and rear sides of shank 243 and their lower ends are secured to stakes 258 secured to the presser plate 98d.

The presser plate holding shank 243 is normally urged to rest against stop 252 at the rear end of keyway 247 by a yieldable helical tension spring 260, extending through a longitudinal bore 261 in the rear end portion of swing arm 97d. The forward end of the spring is fastened to a stake 262 secured to the keypart 245 of the shank 243. The rear end of the spring is fastened to a stake 263 secured in the rear end of bore 261.

The rear end portion of swing arm 97d is secured to the forward ends of bracket members 264, 265 by means of bolts 266. These brackets together form a fork, the spread apart free ends 267, 268 of which are fixedly secured to a rock shaft 269 on which are secured retaining collars 270, 271. The rock shaft is journaled in the bearing brackets 272, 273 which are mounted on and fastened to table plate 166 by screws 259. A pair of torsion springs 274, 275 around the rock shaft are held at their outer ends against said brackets and at their inner ends by stop collars 276, 277 which are fixedly secured to the rock shaft, so that the force of said torsion springs urge the rock shaft in clockwise direction, as viewed in FIG. 15, and hence urge the swing arm to its upward normal position, in which the presser plate is swung away from the table plate 166. The springs 274, 275 are of sufficient strength that the swing arm will move to its upward, normal position if the operator releases his hold on the swing arm.

The apparatus may be operated to prefold a pocket blank to turn in its side and bottom edge portions and to maintain the infolded portions in folded and creased position by the use of a changeable phase stiffening agent in the following manner. A supply of stiffening agent (in this instance para-dcb) is maintained in liquid phase in supply container 37d; the liquid rising by capillary action in the wicking element 70d to maintain the wicking contact surfaces 194, 195, 196, 197 and 198 wetted with the liquid para-dcb. The swing arm 97d may be assumed to be in its up or normal position with the presser plate above the table plate 166 and the presser plate shank 243 and hence the presser plate 98d in their rearward position; the yieldable spring 260 maintaining the plate shank 243 against rearward stop 252. The pocket blank 164 is placed on the cover plate in a position in registry with the U-shaped cutout 53d so that the central panel 279 lies over the yieldable split tongue 174, the edges of which lie in a plane slightly higher than the plane of the wicking element contact surfaces 74d, and with the edge portions 280 to 283 of the blank overlying the U-shaped cutout 53d. The swing arm 97d is swung downward by the operator, thereby to bring the presser plate downwardly into engagement with the blank; the presser plate being held in its normal rearward position by yieldable spring 260. As the bevelled edges 225, 226, 227, 228 of the presser plate pass the opposed bevelled edges 206, of the spring biased folder slide plates 201, 202, 203, 204, which are slideably mounted on table plate 166, the slide plates are moved rearwardly by a cam-like action in a direction away from U-shaped cutout 173, while the presser plate presses the panel 279 of the pocket blank into engagement with the wetted surfaces 194, 195, 196, 197, 198 (referred to collectively as 74d) of the wicking element; the yieldable tongues of the cover plate moving to below the wetted contact surfaces of the wicking element. This brings the pocket blank into firm contact with the wicking element surfaces 194, 195, 196, 197, 198 and causes the liquid para-dcb to impregnate the blank in the pattern of the wetted contact surfaces of the wicking element. The uncut portions 234, 235, 236, 237 of the presser plate 98d, which move into registry with notches in contact surface 74d of the wicking element, prevent impregnation at those places. This arrangement is desirable to avoid too much cooling effect that might be brought about by the presser plate and cooperating parts. Meantime, the edge portions 280, 281, 282, 283 of the blank are folded over the bevel edges of the presser plate 98d by the inward movement of the slide plates 201, 202, 203, 204 caused by the forces of spring 220. The time of the contact of the blank with the wicking element is determined by the operator. Then the swing arm is raised just enough to permit the operator to slide presser plate shank 243 forwardly, against the opposite force of yieldable spring 260 by manually moving knob 253 in a forward direction. The presser plate 98d is thus moved forwardly a sufficient distance to free it from the blank, so that the swing arm may be raised sufficiently to permit the spring 260 to retract the presser plate 98d to its normal position, over the pocket blank. Meantime the leaf springs 220 have caused the folder plates 201, 202, 203, 204 to move forward toward the cutout 53d and press the inturned edge portions 280, 281, 282, 283 down upon the panel 279 of the blank. The operator then again moves the swing arm downwardly so that the presser plate passes the bevelled edges of the folder plates, moving them rearwardly by cam action as mentioned above. The presser plate 98d again presses on the pocket blank, thus to firmly bond the inturned edge portions of the blank to its center panel portion 279. The liquid para-dcb that has impregnated the blank is sufficiently cooled to solidify it, in a manner previously described, and the prefolded pocket blank is then removed for performing such further work on the pocket blank as may be desired. Of course, the cycle may then be repeated to prefold other pocket blanks.

Figure 20:
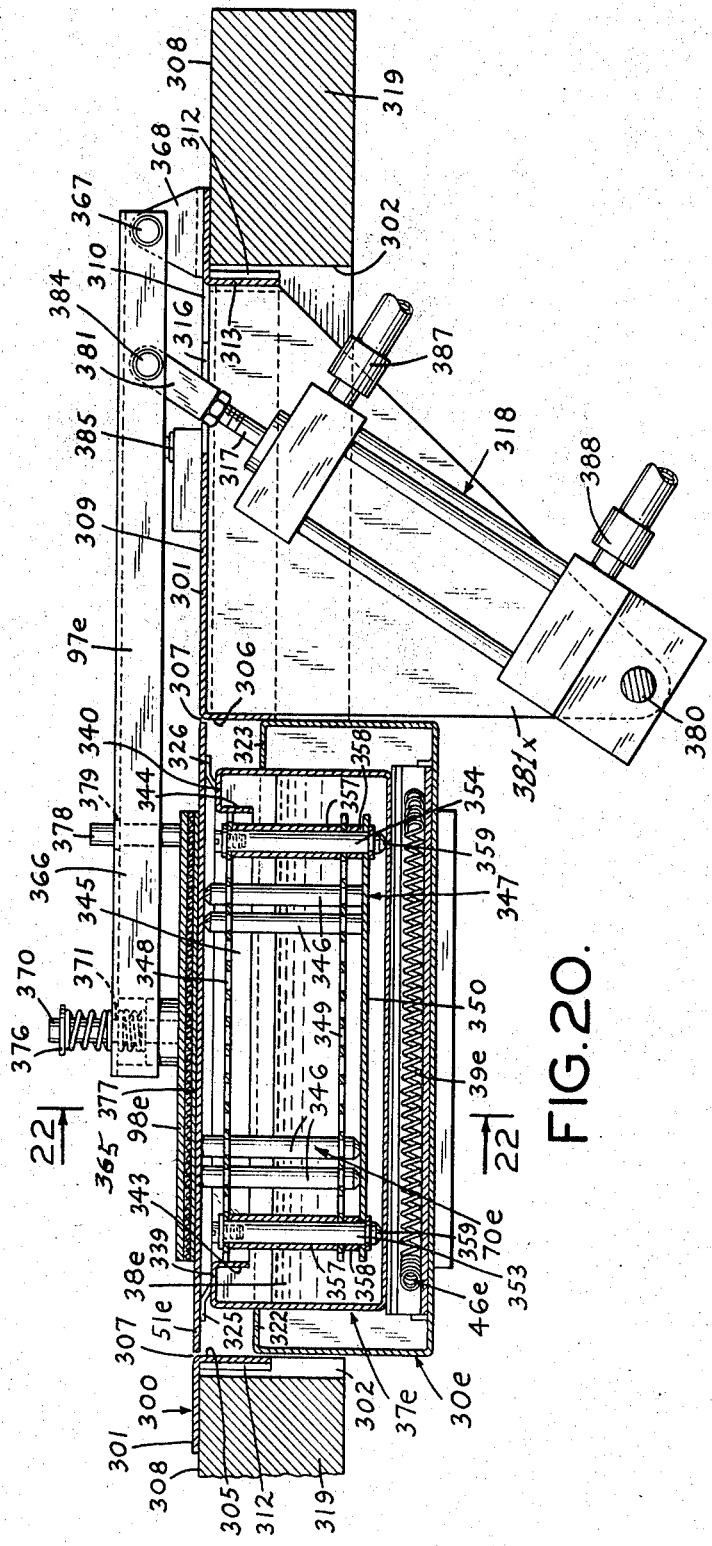
Figures 22, 23:
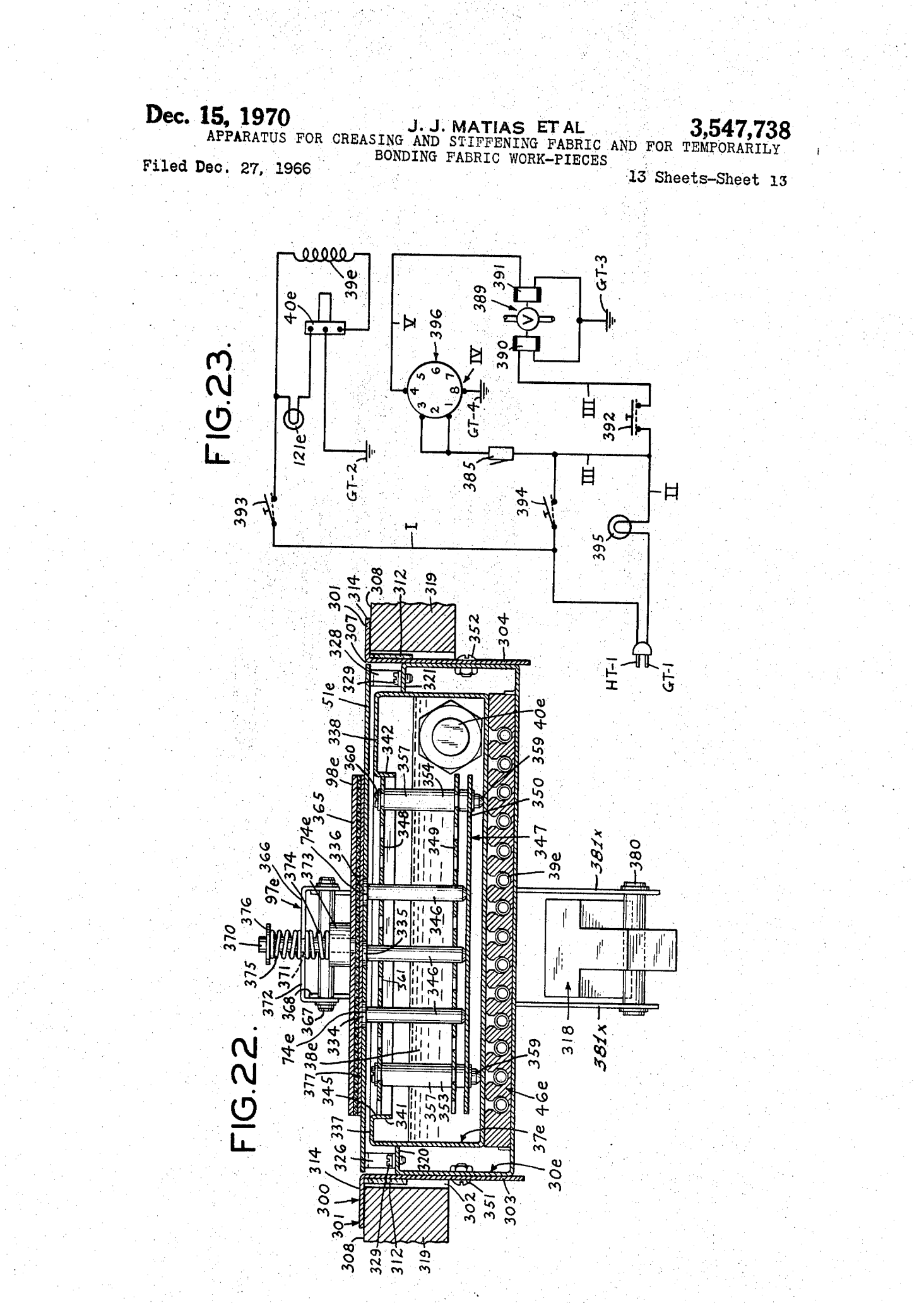
Figure 1:
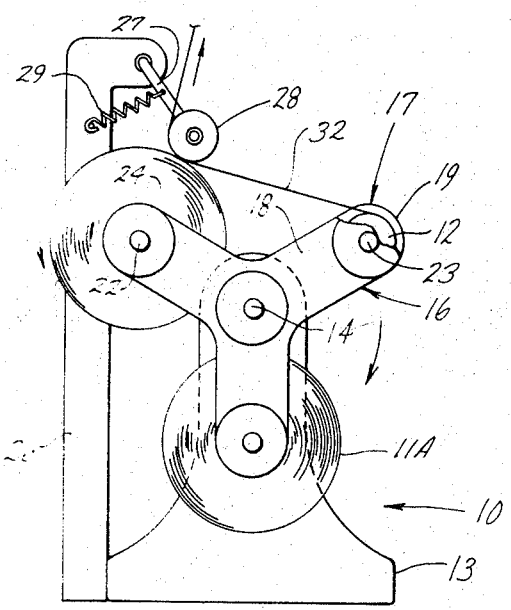

The apparatus shown in FIGS. 20, 21, 22 is adapted for mounting in a rectangular cutout in the working surface of a work bench and illustrates a modification in which the wicking element comprises a plurality of capillary action wicking pins which may be placed or rearranged to impregnate work-pieces with stiffening agent in different patterns and the apparatus also embodies features in addition to those described in connection with the other figures of the drawings.

A frame, designated generally by reference numeral 300, of generally rectangular shape in plan view, comprises a top or table plate 301 having depending plates forming walls which fit into a rectangular opening 302 in the top 319 of a work bench. The frame 300 which includes the table plate 301, is in the form generally of a bottomless box-like structure, within which the outer shell 30e and an insulated supply container 37e may be adjustably mounted and a power means 318 is provided for operating the swing arm 97e with its attached presser plate 98e. However, if a power operated machine is not desired, a swing arm and presser plate arrangement, such as described above in connection with other figures, may be used in lieu of the power operated swing arm. It has been noted hereinbefore that the invention lends itself to various arrangements with interchangeable parts as will be understood from the disclosure.

The frame 300 comprises a top plate 301 having depending side wall flanges or portions 303, 304 and depending front and rear flanges or portions 305, 306. These depending sidewalls form a rectangular opening 307 in the top plate, the latter lying substantially flush with the top surface 308 of the work bench or work table. It will be observed that the sidewalls 303, 304 extend downwardly a greater distance than front and rear walls 305, 306. These walls form a box-like structure having no bottom wall. The rearward part 309 of the top plate has a cutout 310 adjacent to and extending along its rear edge portion. Midway of its length, the cutout 310 has a forwardly extending U-shaped cutout portion 316 to permit movement therethrough of the piston rod 317 of a compressed air cylinder 318 described later on. Downwardly extending reinforcement walls 312 cooperate with said walls 304, 305 and a depending rear wall 313 so as to form a bottomless, box-like frame structure. The frame may be constructed by welding the various parts together to form the frame, so that the edge portions at the sides and at the front and rear form a horizontally extending flat rim portion 314 in generally rectangular shape to rest on the edge portions of the table top bordering on the rectangular cutout 302.

The upstanding side and rear walls of the shell 30e in this embodiment, at their upper ends, have inturned flanges 320, 321, 322, 323, forming a rectangular shelf and providing an opening in which to insert the supply container 37e. The shell 30e is vertically adjustable in the opening 307 by means of screws 351, 352 extending through elongated slots or holes in its side walls. The shell is provided with a heating device 46e including a heating coil 39e on its bottom wall, as described in the foregoing.

A cover plate 51e having a shape to fit the opening 307 in top plate 301 and to move vertically therein, is mounted on spring supports so that in its normal position it lies substantially flush with the top plate. The spring supports comprise leaf springs 325, 326, 327, 328 secured by screws 329 to the inturned side flanges 320, 321 of the shell 30e. The cover plate 51e provides a work-support platform which may be moved downwardly against the upward force of the yieldable spring supports. The work-supporting cover plate 51e is provided with a plurality of spaced holes 331 to 336 which are in registry with the contact surfaces of wicking pins of the wicking element, described later on.

The wicking element 70e is designed so that it can be arranged to cooperate with the arrangement of the cover plate 51e to impregnate fabric work-pieces with stiffening agent in various predetermined patterns. The wicking element or applicator is removably positioned in the supply container 37e, which may be insulated, if desired, and which differs in certain respects from supply container 37 of FIG. 1. The upstanding side and rear walls of the supply container 37e are inturned to form horizontally disposed webs 337, 338, 339, 340 and their free ends are turned downwardly to form vertically disposed flanges 341, 342, 343, 344; these flanges forming a rectangular opening 345 through which the wicking element 70e may be inserted or removed and also serving as guides to maintain the wicking means in proper position.

The wicking element 70e comprises a plurality of wicking pins 346 mounted in a support bracket or rack 347. This supporting rack comprises two spaced perforated plates 348, 349 and a base plate 350. The shape of these plates conforms to the shape of the opening 345 within flanges 341 to 344. This permits and facilitates the locating as well as the removal or replacement of the rack 347 which rests on the bottom wall of the supply container.

The perforated plates 348, 349 and base plate 350 are maintained in spaced superimposed parallel relation on four corner supporting studs 353, 354, 355, 356; tubular spacers 357 being mounted on the studs between the perforated plates and shorter tubular spacers 358 being mounted between the plate 349 and base plate 350. The base plate is maintained in position on the studs by means of C-washers mounted in appropriate grooves in the studs. The C-washers are mounted high enough to provide for feet 359, which rest on the bottom wall of the supply container. Cap screws 360 threaded into appropriate, threaded bores in the upper ends of the corner studs maintain the several plates in clamped position so that the rack is a firm supporting unit. The perforated plates are provided with adjacent spaced holes 361 over their entire areas. These holes are invertical alignment and of a size to permit the wicking pins 346 to slide through them with their lower ends resting upon base plate 350. Preferably, the pins at one or both ends are frusto conical. They are made of porous material such as sintered metal or porous ceramic, and preferably of sintered brass as mentaihed hereinbefore. Now it will be seen that the surfaces 362 at the upper ends of the pins 346 form contact surfaces, which are wetted with liquid stiffening agent contained in the supply container by capillary action. Also it may be observed that by placing a suitable number of wicking pins 346 in selected pairs of superimposed, vertically aligned, holes 361 in the perforated plates, that various patterns of exposed wetted contact surfaces may be produced. Of course, the perforations 331 to 336 in the cover plate will be positioned to register with the upper ends of the wicking pins. It is preferable to provide and have available different replaceable cover plates 51e to conform to the pattern selected for the pattern of impregnation desired in the fabric work-pieces that are to be handled in the machine.

When the cover plate 51e is pressed downwardly against the force of the yieldable spring supports 325 to 328, it is lowered below the plane of the contact surfaces 362 of the wicking pins 346, so that a fabric work-piece or fabric work-pieces superimposed one another when placed on the working platform, provided by the cover plate 51e, is pressed downwardly. Thus a firm contact of the work-piece may be made with the wetted surfaces of the wicking pins, for impregnating the work-piece with liquid stiffening agent in the predetermined pattern.

The presser plate 98e, which is secured to the swing arm 97e, comprises a rectangular plate 365 of a size to correspond to the dimensions of the wicking element 70e. If desired, the under surface of presser plate 365 may have a thin resilient cushion of non-absorbent material. The presser plate 98e is yieldingly secured to the outer end of swing arm 97e, which, as shown, comprises an inverted U-shaped channel arm 366 hingedly secured at its rear end on a hinge pin 367 in a mounting bracket 368 which is fastened to the top plate 301. The presser plate 365 is resiliently mounted on the swing arm by means of an upstanding stud 370 secured at its bottom end to the plate. The stud extends loosely through an aperture 371 in the web 372 of the channel shaped swing arm. A sleeve 373 is mounted on the stud and is spring biased toward the presser plate 365 by a compression spring 374 mounted on the stud between the web 372 of the swing arm and the sleeve 373. A second compression spring 375 is mounted on the stud between a retaining washer 376, secured to the stud, and the upper surface of web 372 of the swing arm. These springs maintain the stud in firm position on the swing arm. When the swing arm is moved downwardly, the springs cause the presser plate to press a work-piece 377 firmly against the contact surfaces of the wicking pins, yet permit a certain amount of yielding upwardly of the presser plate for smooth operation of the machine.

A second upstanding stud 378, at its lower end, is secured to plate 365 rearwardly of the stud 370. This stud extends upwardly and loosely through an aperture 379 in the web of the channel shaped swing arm and serves to maintain the presser plate 365 in alignment and prevents this plate from turning about stud 370 as an axis.

The swing arm is connected to be power operated by an air cylinder 318. The air cylinder at its lower end is hingedly connected to a hinge pin 380 in mounting brackets 381x secured to top plate 301 and extending downwardly therefrom. The reciprocating piston rod 317 of the compressed air cylinder at its outer end is provided with an adjustable clevis 381, the free arms of which are pivotally mounted on a hinge pin 384 extending through the downwardly extending flanges of the channel shaped swing arm. Mounted on the top plate 301 is a microswitch 385 which is engaged by swing arm when it is moved downwardly and is disengaged therefrom when the arm is moved to its upward position. It will now be seen that when the air cylinder is operated to move the piston rod 317 upwardly or forwardly, this will move the swing arm 97e clockwise (as viewed in FIG. 20) about its hinge pin 367 and thereby raise presser 98e upwardly out of engagement with a work-piece 377 on cover plate 51e, and when piston rod 317 is moved to retracted position, this will move presser 98e downwardly to press the work-piece against cover plate 51e and bring the work-piece into firm engagement with the wetted contact surfaces 362 of the wicking pins 346.

The air cylinder 318 has two ports 387, 388 for admitting and releasing compressed air. As shown in FIG. 20, a pair of air hoses connect said ports with a four-way, double acting air valve 389 having two solenoid means 390, 391 (shown schematically in FIG. 23) for insuring positive control over the operation of the four-way valve. Said four-way valve is not shown in the drawings other than schematically in FIG. 23, as such apparatus is known and available in the market. It will be understood that a suitable source of compressed air is provided along with a filter-lubricator-pressure regulator unit, also known and available in the market.

The apparatus illustrated in FIGS. 20 to 23 is semi-automatic. That is, certain manipulations are to be performed by the operator. These manipulations include placing the work-piece onto the cover plate 51e and removing it after the operation is completed, and actuating the starter switch 392 (see FIG. 23). The actuation of the presser plate and the timing of the engagement of the presser plate with the work-piece on the cover plate, and hence the time the wicking surfaces of the wicking element are engaged with the work-piece are controlled automatically.

Referring now to the electrical hook-up as illustrated diagrammatically in FIG. 23 and for purposes of describing the operation of the machine, it may be assumed that swing arm 97e is swung upwardly out of engagement with cover plate 51e to its normal position. In this position the piston rod 317 has been moved upwardly in its forward stroke. The operator now has access to the cover plate 51e which serves as the work-piece platform and places thereon the work-piece that is to be impregnated with liquid stiffening agent in the pattern in accordance with the arrangement of the wicking pins 346. The main switches 393, 394 in the electrical circuitry are closed before the operator actuates the normally open switch 392.

FIG. 23 shows the arrangement of two circuit systems for conducting therethrough A.C. current from a 110 volt, 60 cycle electrical source designated by reference numerals HT–1 and GT–2. One of these circuit systems comprises circuit I. Circuit I extends from terminal HT–1 through the manually operated, normally closed main switch 393, the heating coil 39e, and the thermostat 40e to terminal GT–2. There is also a control or indicator lamp 121 which is connected in parallel with said coil 39e. All terminals indicated by reference character GT are in fact connected to the same terminal as GT–1.

After switch 393 is closed, current will flow through said circuit I, energizing the heating coil 39e (to heat the para-dcb in the supply container). Also, the pilot indicator lamp 121 will light up. It will be understood that the regulating parts 57e (see FIGS. 23 and 21) of the thermostat 40e will have been set to maintain the liquid stiffening agent in the supply container 37e at the desired temperature. When the desired temperature, for which the thermostat is set, is reached, then the thermostat will function as a switch, interrupting circuit I. On the other hand, it will restore current through the heater coil 39e when the temperature of the liquid stiffening agent drops below the desired level.

The second circuit system serves to control the operation of the swing arm 97e and the timing of the wicking action. It comprises circuits II, III, IV and V. Circuit II extends from terminal HT–1 to terminal GT–1 through a second pilot or indicator lamp 395, causing the lamp to light up when the circuit is closed and indicating that the pressing device is operable. The operator now manipulates the manually operable starter switch 392, said switch being an impulse switch. On closing the contacts, an impulse type-current is caused to flow through circuit III. Circuit III extends from terminal HT–1 over normally closed main switch 394, the starter switch 392, and the air valve solenoid 390 to terminal GT–3. This briefly energizes solenoid 390, causing the four-way air valve 389 to be so adjusted to permit the flow of compressed air through port 387 (see FIGS. 20 and 23) of the air cylinder 318. This causes retraction of piston rod 317. It is not deemed necessary to discuss and describe in detail the various parts and functions of said air valve or air cylinder, as both items are standard, known, and available in the market and function in accordance with well known principles. Upon the passage of air through port 387 of the air cylinder, and the retraction of the piston rod, the swing arm 97e is lowered into engagement with the work-piece resting on the cover plate 51e, causing the cover plate to be depressed against the force of the spring supports 325 to 327. This brings the work-piece into firm contact with the wetted surfaces 74e of the wicking pins and the liquid stiffening agent begins to impregnate the work-piece. The amount and time of impregnation is controlled by the timing unit 396.

In reaching its most downward position, the swing arm 97e engages microswitch 385. Actuation of this microswitch closes circuit IV. Circuit IV extends from terminal HT–1 over main switch 394, the now closed microswitch 385 a timer unit 396 to terminal GT–4, which as mentioned above is connected to or the same as terminal GT–1; all terminals indicated as GT being connected or the same. The timer unit 396 is also a known item available in the market. A timer unit, Model No. 591–14 sold by G. C. Wilson Co., is suitable and the leads to and from the timer unit are hooked up in accordance with known instruction supplied with the unit. Current now flows through the timer unit and starts a predetermined time interval for which the unit has been set. After the lapse of the time interval, a switch mechanism in it is actuated, closing circuit V. Circuit V extends from terminal HT–1 over main switch 394, microswitch 385, timer 396 and the second valve solenoid 391 to terminal GT–3. At this point, the first valve solenoid 390 has been de-energized as its energization lasted only for the brief instant of the impulse during which current was conducted through circuit III over impulse switch 392.

With solenoid 391 energized, the four-way valve 389 is readjusted to permit flow of compressed air to the air cylinder in the reverse direction, through port 388. This will cause piston rod 317 to be projected outwardly or forwardly and to move the swing arm 97e upwardly to its initial or normal position. Meantime, the swing arm is disengaged from microswitch 385, so that circuit IV is interrupted and current can no longer flow through circuits IV and V. This causes the timing unit 396 to reset itself and, after the operator replaces the old and now impregnated work-piece with a new one, the apparatus is ready for repeating the described cycle of operation. The amount of impregnation of stiffening agent into the fabric is controlled by adjusting the timing unit to hold the fabric in contact with the wetted surfaces of the wicking element for such time as will cause the desired amount of wicking of the stiffening agent into the fabric.

It will be seen from the foregoing description that the invention provides means and method for impregnating a fabric work-piece by utilizing a single or a plurality of rigid wicking elements through which stiffening agent in liquid form moves by capillary action, thus permitting the supply container for the stiffening agent to the positioned below the work. The contact surfaces of the wicking elements may be shaped to various definite patterns or designs. And the contacting surfaces can not be deformed although pressure is applied on them because the wicking elements are rigid. The application of the stiffening agent may be limited to small areas of the fabric work-piece, or work-pieces, by using a wicking element having corresponding small contact surfaces. Furthermore, rigid wicking elements are wear resistant and therefore have prolonged life in use.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for applying a changeable phase stiffening agent to fabric for impregnating the fabric with the stiffening agent in a given pattern which comprises a frame structure; a stiffening agent supply container carried by the frame structure for maintaining therein a supply of the stiffening agent in its liquid form; a rigid porous wicking element mounted in said supply container and positioned so that it is in contact with a supply of liquid stiffening agent therein and having an exposed contact surface wetted by liquid stiffening agent in said container by movement of said liquid from said supply through said wicking element by capillary action; a cover plate mounted over said supply container and having an aperture therein in registry with said exposed contact surface, presser means mounted above said cover plate having a presser element engageable with and disengageable from a work-piece placed on said cover plate and positioned over said aperture, and means operable to manipulate said positioned work-piece and the wetted contact surface of the wicking element into firm engagement with each other to cause said liquid stiffening agent to wick into said fabric to impregnate it with stiffening agent and to disengage said presser element out of contact with said work-piece after it is impregnated to permit removal of the impregnated work-piece from said cover plate.

2. Apparatus for applying a changeable phase stiffening agent to fabric for impregnating the fabric with the stiffening agent in a given pattern which comprises a frame structure, a stiffening agent supply container carried by the frame structure for maintaining therein a supply of the stiffening agent in its liquid form, a rigid porous wicking element mounted in said supply container and positioned so that it is in contact with a supply of liquid stiffening agent therein and having an exposed contact surface wetted by liquid stiffening agent in said container by movement if said liquid from said supply through said wicking element by capillary action, means for supplying heat to stiffening agent contained in said supply container, a cover plate mounted over said supply container and having an aperture therein in registry with said exposed contact surface, presser means including an arm mounted on said frame structure for swingable movement above said cover plate, a presser element mounted on said swing arm movable upon downward swing of said arm, into engagement with a work-piece placed on said cover plate and positioned over said aperture to apply a pressure on said workpiece to cause said workpiece to firmly engage the wetted contact surface of the wicking element and the liquid stiffening agent to wick into said fabric to impregnate it with stiffening agent, said presser element being movable, upon upward swing of said arm, out of contact with said workpiece after it is impregnated to permit removal of the impregnated workpiece from said cover plate.

3. Apparatus according to claim 1, in which said cover plate comprises a spring action workpiece platfrom around said aperture in the cover plate, the edge portions of said cover plate which define said aperture normally lying in a plane which is adjacent to but not lower than the exposed wetted contact surface of the wicking element, said edge portions moving to below said contact surface of the wicking element when downward pressure is applied by said presser means on a workpiece resting upon said platform and overlying said aperture.

4. Apparatus according to claim 2, in which said frame structure comprises a box-like shell, said supply container is mounted in said shell and has upstanding side walls, end walls and a bottom wall, and open at its upper end, said cover plate is mounted over the upper end of said supply container and has a plurality of slot-like cutouts extending outwardly from said aperture in the cover plate and terminating short of its periphery to provide resilient tongues around said aperture.

5. Apparatus according to claim 1, which includes a heat controlled heating means adjacent said supply container for maintaining liquid stiffening agent in said supply container at a substantially constant temperature at which movement of said liquid by capillary action through said wicking element to said contact surface is assured.

6. Apparatus according to claim 5, in which said heating means comprises an electrical heating coil adjacent said supply container, a thermostat in said supply container and an electrical circuit connected to said coil and thermostat for maintaining liquid stiffening agent in said supply container at substanitally costant predetermined temperature.

7. Apparatus according to claim 2, in which the aperture in said cover plate is centrally located and said cover plate has a plurality of radial slot-like cutouts extending in a generally radial direction from said aperture and terminating short of the periphery of said cover plate and providing a plurality of tongue-like portions around said aperture the inner edge portions of which are resilient.

8. Apparatus according to claim 7, in which said aperture is circular in shape and said wicking element contact surface is of corresponding circular shape.

9. Apparatus according to claim 2, in which said swing arm is hingedly mounted at its rear end portion on said frame structure and its opposite forward end portion is free to swing upwardly and downwardly and said presser element is secured to said swing arm intermediate its ends and positioned to engage a workpiece in the vicinity of the aperture in the cover plate when said workpiece is placed on the cover plate in a position overlying the aperture.

10. Apparatus according to claim 3, in which said spring action workpiece platform comprises a pair of oppositely disposed spring plates made of flat metal each having a spring loop at its rear end portion secured to said frame structure and a flat portion extending inwardly from said loop portion, each of said flat portions having an edge lying parallel with the long axis of its loop portion, said edges being oppositely disposed and aligned in spaced parallel relation to provide an elongated aperture in said workpiece platform.

11. Apparatus according to claim 3, in which the aperture in said cover plate is in the form of an elongated slot, said pressure element is positioned intermediate the ends of said swing arm and said presser element has a pair of depending spaced elongated webs which, upon downward swing of said swing arm, engage the workpiece along each side of said slot when said workpiece is positioned on said cover plate overlying said slot.

12. Apparatus according to claim 4, in which the aperture in the cover plate is circular in form, the contact surface of the wicking element is correspondingly circular in form and the presser element is in ring-shaped form and positioned to engage the workpiece on said cover plate around the periphery of said aperture upon downward swing of the swing arm.

13. Apparatus according to claim 2, in which said heating means comprises an electric heating coil mounted adjacent said supply container, a thermostat responsive to the temperature of stiffening agent contained in the supply container is mounted in the supply container, said heating coil and thermostat being connected in an electric circuit and said thermostat being connected to control current flowing through said heating coil in response to temperature change of stiffening agent in said supply container to maintain the stiffening agent at substantially constant temperature.

14. Apparatus for infolding the edge portions of blanks of fabric, such as a shirt pocket blank, or the like, having a panel portion and edge portion to be folded and stiffening the fabric at the infolded edges, which comprises a frame structure, a supply container carried by the frame structure in which a bath of changeable phase stiffening agent is maintained in its liquid phase, a rigid porous wicking element mounted in said supply container in contact with the bath of stiffening agent in said supply container and having an exposed contact surface above the level of said bath and wetted by liquid from said bath by capillary action, said contact surface having the shape of the peripheral edge portions of the blank to be folded, controlled heating means maintaining said bath of stiffening agent in liquid phase at a substantially constant predetermined temperature, a cover plate serving as a work-piece platform mounted over said supply container, said cover plate having a first slot-like cutout in the shape of the periphery formed by the foldable edge portions of the blank in registry with said exposed contact surface of the wicking element, a plurality of cutout slots extending outwardly from said first slot-like cutout forming resilient tongue portions around said first cutout, the inner end portions of said tongues normally lying in a plane adjacent the plane of said contact surface but not below said contact surface, a swing arm mounted above said cover plate hinged at its rear end on said frame structure, the opposite end of said arm being free to swing upwardly and downwardly about its hinged end, presser plate means having a shank portion on which at its lower end is mounted a generally horizontally disposed presser plate having a peripheral shape corresponding to the shape of said first cutout, said presser plate having bevelled edges inclined upwardly and inwardly, said shank having a key portion at its upper end, a longitudinal keyway in the forward end portion of said swing arm in which said key portion is slideably mounted, said keyway providing a stop at its forward end and a stop at its rear end for limiting the slideable movement of said key portion along said swing arm, yieldable spring means mounted on said arm normally urging said key portion against said rear stop and hence placing said presser plate at a position overlying said first cutout, a top plate mounted above said cover plate and having a cutout permitting passage therethrough of said presser plate, a plurality of slideable folder plates mounted on said top plate opposite the bevelled edges of said presser plate and slideable toward and away from said first cutout, said folder plates at their inner ends having bevelled edges inclined upwardly and outwardly opposed to the bevelled edges of said presser plate, said folder plate bevelled edges normally lying over said first cutout and in the vertical path of travel of the bevelled edge portions of said presser plate when said presser plate is in its normal rearmost position on said swing arm and is swung in an upward and downward direction, yieldable spring biased means mounted on said top plate engaging said folder plates and urging said folder plates toward said first cutout, said apparatus, when a blank is placed on said cover plate with its edge portions to be folded overlying said first cutout, being operative in such manner that, upon downward swing of said swing arm, the presser plate at its bevelled edges moves the opposed bevelled edges of said folder plates, causing the folder plates to move outwardly on the top plate and the presser plate downwardly while folding the edge portions of blank upwardly and causing the blank at its foldable edge portions to firmly engage the contact surface of the wicking element which is wetted by liquid stiffening agent passing thereto from said bath by capillary action, thereby impregnating the fabric with liquid stiffening agent, after which said presser plate is moved forwardly, permitting the swing arm to be swung upwardly and the presser plate to move to its rearward normal position on the swing arm and permitting said folder plates to move inwardly to fold said edge portions inwardly over the panel portion of the blank, and upon another downward movement of said swing arm the presser plate presses the infolded edge portions of the blank into engagement with the panel portion of the blank, the liquid stiffening agent impregnated into the fabric being cooled by said folding parts and ambient atmosphere to solidified state and thereby stiffening the fabric.

15. Apparatus according to claim 14, in which said controlled heating means comprises an electrical heating coil mounted adjacent to the bath of stiffening agent in said supply container, an electric power circuit connected to said heating coil, a thermostat in said supply container connected in said circuit, controlling flow of current through said heating coil in response to change of temperature of said bath for maintaining said bath at a substantially constant temperature.

16. Apparatus for applying a changeable phase stiffening agent to work-pieces of fabric to impregnate the fabric with the stiffening agent in selected patterns which comprises a frame structure, a supply container mounted on said frame structure in which is maintained a bath of the stiffening agent in its liquid phase, said container having an opening at its upper end, means for heating the stiffening agent contained in the supply container, a wicking element unit mounted in said supply container, said wicking element unit comprising a support rack having a pair of spaced horizontally disposed pin retaining plates one above the other and each having a plurality of spaced holes over a substantial area thereof, the holes in one of the plates being in alignment with the holes of the other plate, a plurality of rigid porous wicking pins slideably mounted in selected aligned holes in said pin retaining plates having exposed contact surfaces at the top ends of said pins wetted by said liquid passing through said wicking pins from said bath by capillary action, a cover plate serving as a workpiece plateform mounted over said opening in the upper end of said supply container, said cover plate having apertures therein registering with the contact surfaces of the wicking pins mounted in selected holes of said pin retaining plates, said cover plate apertures being of a dimension slightly larger than the contact surfaces of wicking pins in registry therewith, spring supports mounting said cover plate and arranged to maintain the upper surface of said cover plate when in normal position adjacent the plane through the contact surfaces but not below said plane, said spring supports permitting the upper surface of said cover plate to move from its normal position to below said plane upon pressure being exerted on said cover plate in a downward direction, a swing arm mounted above said cover plate hinged at its rear end on said frame structure, the opposite end of said arm being free to swing upwardly to normal position and downwardly from normal position toward said cover plate, a flat presser plate having dimensions corresponding to the dimensions of said cover plate firmly but resiliently secured to the outer end portion of said swing arm and positioned in registry with said cover plate, said presser plate in normal position when said arm is swung to its upward position permitting placement of a work-piece on the supporting platform provided by said cover plate, and said presser plate engaging said work-piece positioned on said cover plate and applying downward pressure on said work-piece and cover plate upon swinging said arm downwardly, causing said workpiece to firmly contact the wetted contact surfaces of said wicking pins and impregnating said work-piece at said surfaces to impregnate the work-piece in the places where the wicking pins are selectively located in the pin supporting rack.

17. Apparatus according to claim 16, in which said heating means comprises an electrical heating element adjacent the bath of stiffening agent in said supply container, an electric power circuit connected to said heating element, a thermostat in said supply container connected in said circuit controlling flow of current through said heating element in response to change of temperature of said bath for maintaining said bath at a substantially constant temperature.

18. Apparatus according to claim 17, which includes power means for operating said swing arm, said power means comprising an air cylinder having a reciprocatable piston, the outer end of which is connected to said swing arm, a compressed air conduit system connected to said cylinder, and valve means in said air conduit system operable to selectly pass compressed air into said cylinder to move said piston in a forward stroke to swing said arm in one direction and to retract said piston to swing said arm in the opposite direction.

19. Apparatus according to claim 18, in which said valve means comprises a four-way, solenoid operated valve unit and said apparatus includes another electrical circuit, a micro-switch in said other circuit operative in response to upward swing and downward swing of said arm, an adjustable timer unit in said further electrical circuit operable in response to activation of said micro-switch to control the operation of said solenoid four-way valve unit and the time interval said presser plate maintains the work-piece in contact with the wetted contact surface of the wicking element when said power means swings said arm downwardly into engagement with the work-piece on the work-piece platform, said solenoid valve unit operating in response to operation of said timer unit.

20. Apparatus for applying a changeable phase stiffening agent, such as para-dichlorobenzene, to a fabric work-piece which comprises means including a container in which is maintained a supply of stiffening agent; heating means associated with said supply to maintain the supply of stiffening agent in liquid phase; wicking means comprising a rigid element having pores therein in communication with said liquid supply, said rigid wicking element having a free exposed contact face wetted by said liquid stiffening agent passed through said pores; a work-piece platform having a surface on which a work-piece may be supported normally overlying said contact face, said platform having an aperture therethrough having a pattern corresponding to the pattern of said contact face, said platform being mounted with said aperture in registry with said contact face and said aperture being dimentioned to permit passage of said contact face therethrough; resilient means associated with the apertured work-piece platform permitting the surface of the platform bordering on said aperture to be moved from its normal position above said contact face to below said contact face and to return to normal position above said face; means comprising a presser device mounted above said platform for upward and downward movement and operable, upon downward movement, to press the surface of said platform bordering on said aperture to below said contact face and, upon upward movement, permitting said surface bordering on said aperture to move to normal position above said contact face.

21. Apparatus according to claim 20, in which the resilient means associated with said platform comprise means providing springy members forming a part of the platform so that the platform itself is springy in the area bordering on the aperture therein.

22. Apparatus according to claim 20, in which the resilient means associated with said platform comprise yieldable springs mounting said platform in normal position and permitting downward movement of the platform from normal position upon application of downward pressing force thereon by said presser device.

References Cited

UNITED STATES PATENTS 3,498,262   3/1970   Hill et al. _____ 118—261

LELAND A. SEBASTIAN, Primary Examiner

U.S. Cl. X.R.

118—5, 264; 156—474, 479, 483, 484, 578

Dec. 15, 1970   H. N. BEUTE   3,547,739
PERFORATED TAPE
Filed May 15, 1969

INVENTOR.
HARVEY N. BEUTE
BY
Woodhams, Blanchard & Flynn
ATTORNEYS